(12) United States Patent
Guta et al.

(10) Patent No.: US 11,442,599 B2
(45) Date of Patent: Sep. 13, 2022

(54) SYSTEMS AND METHODS FOR HOSTING A BROWSER WITHIN ANOTHER BROWSER

(71) Applicant: Microsoft Technology Licensing, LLC, Redmond, WA (US)

(72) Inventors: Adrian Bogdan Guta, Bellevue, WA (US); Joshua P. H. Tseng, Kirkland, WA (US); Stefanie K. McCallum, Snohomish, WA (US); Navin Agarwal, Kirkland, WA (US); Corey M. Bloodstein, Redmond, WA (US); Thomas W. Bolds, Seattle, WA (US); Venkatraman V. Kudallur, Redmond, WA (US); Fredric W. Pullen, III, Duvall, WA (US); Tony E. Schreiner, Broomfield, CO (US); Michael J. Ens, Redmond, WA (US); Benjamin J. Bamesberger, Bellevue, WA (US); Ning Zhong, Bellevue, WA (US); Alex Glover, Carnation, WA (US); Andrew M. Lake, Seattle, WA (US); Clifton J. Hebert, Bellevue, WA (US); Emily K. Andrews, Redmond, WA (US); Stefan F. Smolen, Bellevue, WA (US); Todd A. Sahl, Seattle, WA (US); Wenming Ju, Bellevue, WA (US); Xiaoying Huang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/566,689

(22) Filed: Sep. 10, 2019

(65) Prior Publication Data
US 2020/0387273 A1 Dec. 10, 2020

Related U.S. Application Data

(60) Provisional application No. 62/858,900, filed on Jun. 7, 2019.

(51) Int. Cl.
| | | |
|---|---|---|
| *G06F 3/0483* | (2013.01) | |
| *G06F 16/957* | (2019.01) | |
| *G06F 21/62* | (2013.01) | |

(52) U.S. Cl.
CPC ........ *G06F 3/0483* (2013.01); *G06F 16/9574* (2019.01); *G06F 21/629* (2013.01)

(58) Field of Classification Search
CPC .. G06F 3/0483; G06F 3/0481; G06F 16/9574; G06F 16/954; G06F 21/629;
(Continued)

(56) References Cited

U.S. PATENT DOCUMENTS

| | | |
|---|---|---|
| 7,818,681 B2 | 10/2010 | Abuelsaad et al. |
| 9,262,396 B1 | 2/2016 | Rodriguez Valadez et al. |

(Continued)

OTHER PUBLICATIONS

"Non Final Office Action Issued in U.S. Appl. No. 16/897,937", dated Jan. 27, 2021, 22 Pages.
(Continued)

*Primary Examiner* — Phuong H Nguyen

(57) ABSTRACT

An integrated approach is provided to running web applications with various compatibilities that do not require third-party extensions or sacrifice user experience. When a page of an application incompatible with a first browser is to be executed, an instance of a second browser with which the page is compatible is separately invoked and/or executed without opening a window for that second browser. Instead, the second browser opens a page within the window of the first browser. Moreover, rendering and/or contextual information for a page opened via the second browser is provided to the first browser. Such information is utilized by the first browser to provide a visual experience to the user in which the web page is being hosted by the first browser, even though it is in fact being hosted by the second browser.

20 Claims, 9 Drawing Sheets

(58) Field of Classification Search
CPC .. G06F 9/44536; G06F 9/44526; G06F 9/451; H04L 67/02
See application file for complete search history.

(56) References Cited

U.S. PATENT DOCUMENTS

| | | |
|---|---|---|
| 10,733,260 B1 | 8/2020 | Sahl et al. |
| 2001/0013043 A1 | 8/2001 | Wagner |
| 2005/0246444 A1 | 11/2005 | Koehane et al. |
| 2006/0010433 A1 | 1/2006 | Neil et al. |
| 2006/0288083 A1 | 12/2006 | Ueda et al. |
| 2007/0192329 A1 | 8/2007 | Croft et al. |
| 2007/0239859 A1 | 10/2007 | Wilkinson et al. |
| 2007/0260702 A1 | 11/2007 | Richardson et al. |
| 2007/0271505 A1 | 11/2007 | Dandekar et al. |
| 2008/0229331 A1 | 9/2008 | Khijniak et al. |
| 2008/0301562 A1 | 12/2008 | Berger et al. |
| 2009/0172519 A1 | 7/2009 | Xu et al. |
| 2009/0210482 A1 | 8/2009 | Wynn |
| 2010/0042636 A1 | 2/2010 | Lu |
| 2010/0211865 A1 | 8/2010 | Fanning et al. |
| 2010/0269046 A1 | 10/2010 | Pahlavan et al. |
| 2010/0301562 A1 | 12/2010 | Nedelcu |
| 2011/0157219 A1 | 6/2011 | Chakra et al. |
| 2011/0302510 A1* | 12/2011 | Harrison .............. G06F 40/143 715/760 |
| 2012/0166975 A1 | 6/2012 | Oh et al. |
| 2013/0007642 A1 | 1/2013 | Abuelsaad et al. |
| 2013/0014126 A1 | 1/2013 | Zana et al. |
| 2013/0104060 A1 | 4/2013 | Chandra et al. |
| 2013/0262555 A1 | 10/2013 | Hochmuth |
| 2013/0339842 A1 | 12/2013 | Zhang et al. |
| 2014/0026057 A1 | 1/2014 | Kimpton et al. |
| 2014/0108496 A1 | 4/2014 | Heller et al. |
| 2014/0149995 A1 | 5/2014 | Tian |
| 2014/0380315 A1 | 12/2014 | Khajuria et al. |
| 2015/0026682 A1 | 1/2015 | Mohammad et al. |
| 2015/0094150 A1 | 4/2015 | Gregory et al. |
| 2015/0161277 A1* | 6/2015 | Heller .............. G06F 9/44526 715/229 |
| 2015/0341367 A1 | 11/2015 | Kus et al. |
| 2016/0062727 A1 | 3/2016 | Handrigan et al. |
| 2016/0266780 A1 | 9/2016 | Wu |
| 2017/0034127 A1 | 2/2017 | Singleton et al. |
| 2017/0339250 A1 | 11/2017 | Momchilov et al. |
| 2017/0374130 A1 | 12/2017 | Abiezzi et al. |
| 2020/0319865 A1 | 10/2020 | Levi et al. |

OTHER PUBLICATIONS

Jackson, et al., "Configure IE mode policies", Retrieved from: https://docs.microsoft.com/en-us/deployedge/edge-ie-mode-policies, Mar. 25, 2020, 5 Pages.

"International Search Report and Written Opinion Issued in PCT Application No. PCT/US2020/030339", dated Jul. 14, 2020, 12 Pages.

Ross, et al., "Welcome to Remote Desktop Services", Retrieved from: https://docs.microsoft.com/en-us/windows-server/remote/remote-desktop-services/welcome-to-rds, Feb. 22, 2017, 2 Pages.

Wesley, et al., "About IE mode", Retrieved from: https://docs.microsoft.com/en-us/deployedge/edge-ie-mode, Mar. 25, 2020, 4 Pages.

"International Search Report and Written Opinion Issued in PCT Application No. PCT/US21/025845", dated Jun. 28, 2021, 14 Pages.

"Non Final Office Action Issued in U.S. Appl. No. 16/897,937", dated Aug. 30, 2021, 22 Pages.

"Final Office Action Issued in U.S. Appl. No. 16/897,937", dated Mar. 14, 2022, 24 Pages.

Garsiel, et al., "How Browsers Work: Behind the Scenes of Modern Web Browsers", Retrieved from: https://www.html5rocks.com/en/tutorials/internals/howbrowserswork/, Aug. 5, 2011, 55 Pages.

Mishra, Praveen, "Browser Engines: The Crux of Cross Browser Compatibility", Retrieved From: https://www.lambdatest.com/blog/browser-engines-the-crux-of-cross-browser-compatibility/, Aug. 27, 2019, 16 Pages.

* cited by examiner

SYSTEMS AND METHODS FOR HOSTING A BROWSER WITHIN ANOTHER BROWSER

CROSS-REFERENCE TO RELATED APPLICATIONS

This application claims priority to U.S. Provisional Patent Application No. 62/858,900, filed Jun. 7, 2019, entitled "Systems and Methods for Hosting a Browser Within Another Browser," the entirety of which is incorporated by reference herein.

BACKGROUND

A web browser (or "browser") is a software application for accessing information on the World Wide Web. A web browser is installed on user devices to enable users of those devices to retrieve resources (e.g., individual web pages, images, videos, etc.) from a web server and display them on the user devices. Web browsers are also used to run applications (e.g., webmail, online retail sales, online auction), referred to as "web applications" or "web apps." A web application is a client-server computer program in which the client (including the user interface and client-side logic) runs in a web browser. The client communicates with the server as needed to fulfill the functions of the web application at the user device.

As web browsers have progressed over the years, enterprises have developed content that takes advantage of the increasing capability of the advancing web browsers as well as the capabilities of new web browsers. In some cases, content, such as a web application, developed for a particular web browser type and/or browser version has not been updated to be compatible with more modern web browsers and/or browser versions. Accordingly, such content may be incompatible with newer web browsers and/or browser versions, and thus is forced to be run in less advanced browser types and/or versions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein enable an integrated approach to running web applications with various compatibilities that do not require third-party extensions or sacrifice user experience. In embodiments, when a page of an application incompatible with a first web browser is to be executed, an instance of a second web browser with which the page is compatible is separately invoked and/or executed without opening a window for that second browser. Instead, the second browser opens a page within the window of the first browser. This enables an effective and efficient user experience by enabling the running of different web applications that have different web browser compatibilities in a same browser window. Moreover, rendering and/or contextual information for a page opened via the second browser is provided to the first browser. Such information is utilized by the first browser to provide a visual experience to the user in which the web page is being hosted by the first browser, even though it is in fact being hosted by the second browser.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 13:
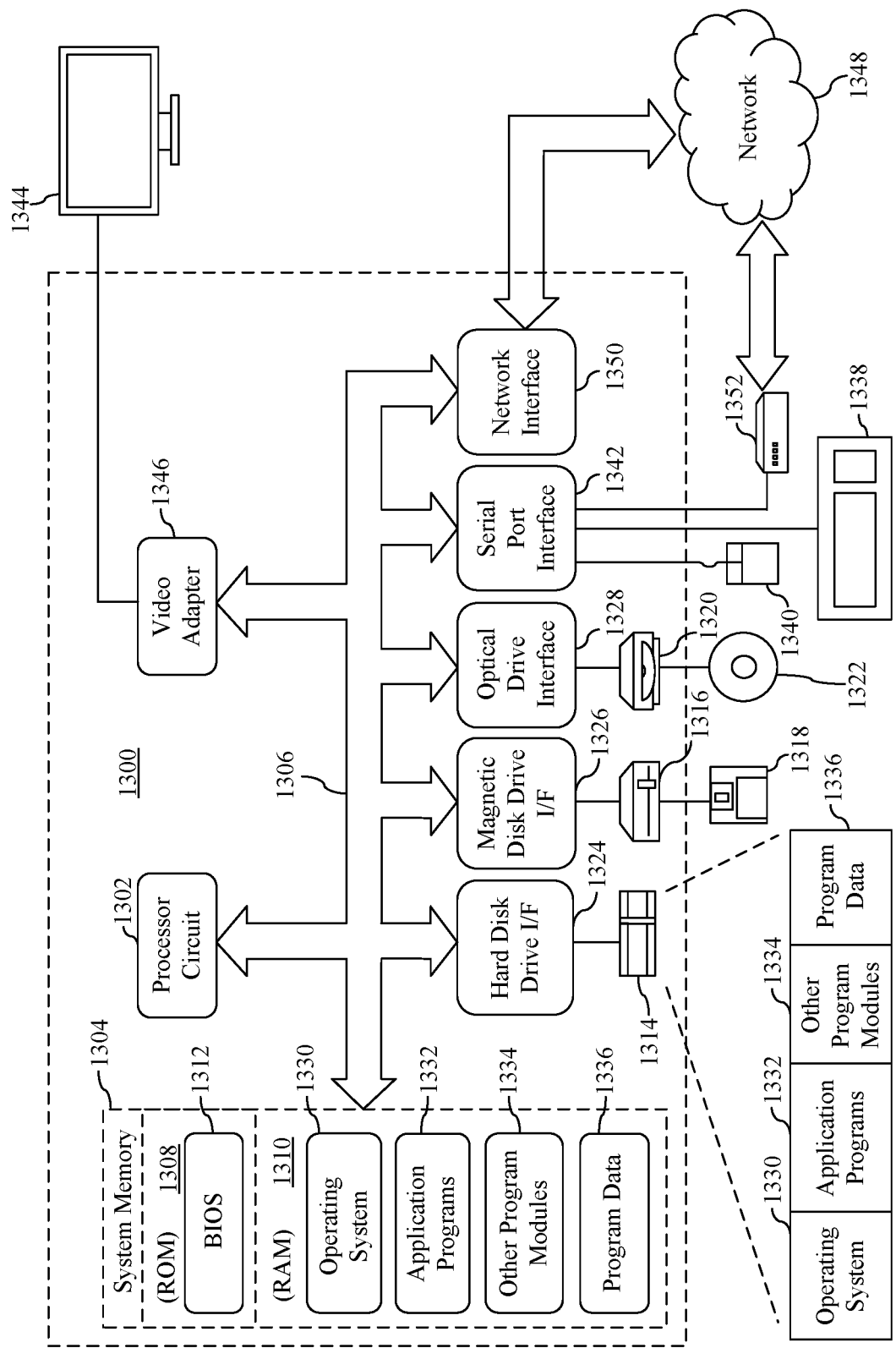

In an embodiment FIG. 13 is a block diagram of an example processor-based computer system that may be used to implement various embodiments.

The features and advantages of the embodiments described herein will become more apparent from the detailed description set forth below when taken in conjunction with the drawings, in which like reference characters identify corresponding elements throughout. In the draw-

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As described above, as web browsers have progressed over the years, enterprises have developed content that takes advantage of the increasing capability of the advancing web browsers as well as the capabilities of new web browsers. In some cases, content, such as a web application, developed for a particular web browser type and/or browser version has not been updated to be compatible with more modern web browsers and/or browser versions. Accordingly, such content may be incompatible with newer web browsers and/or browser versions, and thus is forced to be run in less advanced browser types and/or versions. This is inconvenient for users who are forced to maintain old versions of web browsers so that the content incompatible with more recent browser technology can continue to be accessed.

In the case of a web application, a potential solution to this problem is that the web application be given dual solutions, meaning that multiple versions of the web application are developed and maintained (e.g., for each browser type/version of interest). However, such an approach consumes resources and time. Furthermore, users would need to know which browser version is compatible with which web application version. Another solution introduces the notion of auto-switching, where web applications would open up a new browser application and switch to that browser application based on a specification format that allowed administrators to specify a list of web app sites and the compatible browsers. However, this solution is visible to the user and very distracting. Another solution introduces the notion of invoking a new browser window for a browser compatible with a web app from an open browser window for an incompatible browser in which the web app was attempted to be opened. While this may be an improvement over other solutions, it has shortfalls including the need to switch between separate browsers in separate windows.

Embodiments described herein help address these and other issues related to content compatibility with web browsers. In particular, embodiments described herein enable an integrated approach to running web applications with various compatibilities that do not require third-party extensions or sacrifice user experience. In embodiments, when a page of an application incompatible with a first web browser is to be executed, an instance of a second web browser with which the page is compatible is separately invoked and/or executed without opening a window for that second browser. Instead, the second browser opens a page within the window of the first browser. This enables an effective and efficient user experience by enabling the running of different web applications that have different web browser compatibilities in a same browser window. Moreover, rendering and/or contextual information for a page opened via the second browser is provided to the first browser. Such information is utilized by the first browser to provide a visual experience to the user in which the web page is being hosted by the first browser, even though it is in fact being hosted by the second browser.

Figure 1A:
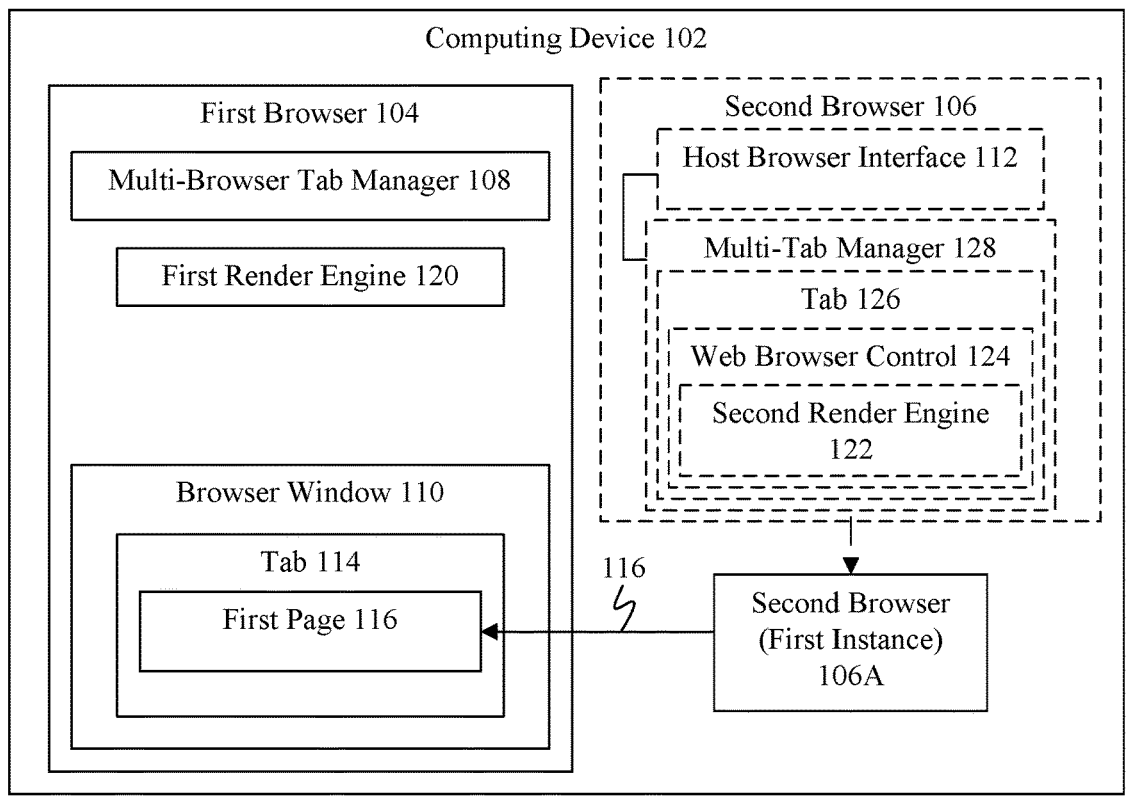
FIG. 1A and FIG. 1B show block diagrams of a system for managing page compatibility between a first (primary) browser and a second (secondary) browser in a computing device, according to an example embodiment.
Figure 1B:
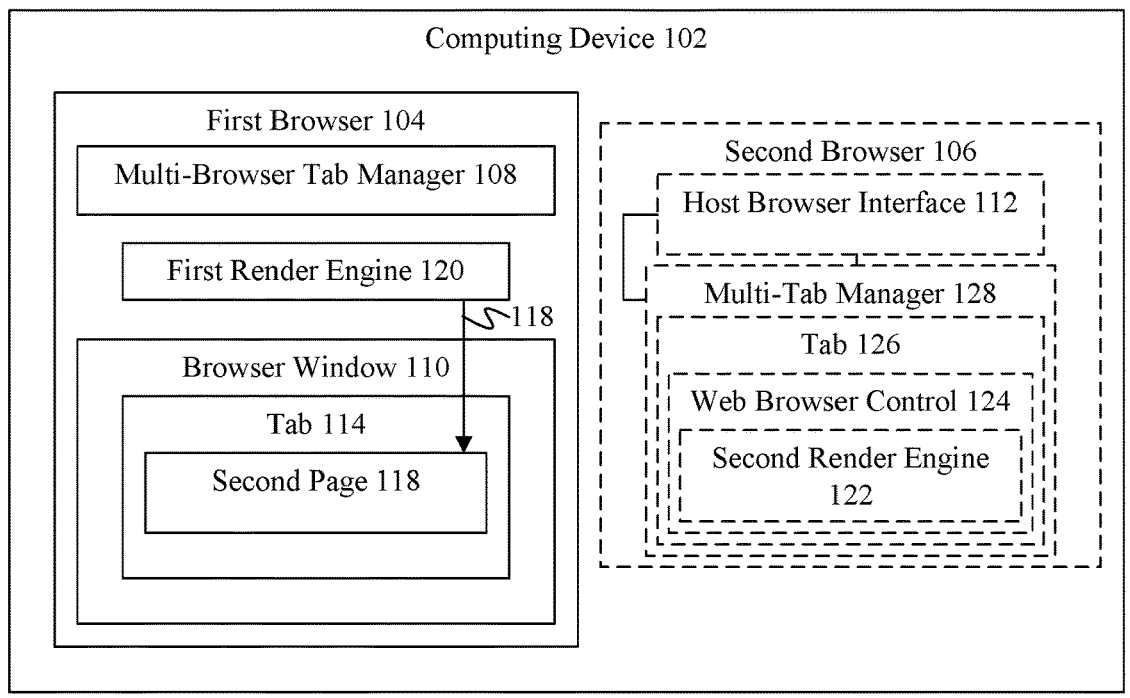

Such embodiments may be implemented in various ways. For instance, FIG. 1A and FIG. 1B show block diagrams of a system 100 for managing page compatibility between a first (primary) browser 104 and a second (secondary) browser 106, according to an example embodiment. As shown in FIG. 1A and FIG. 1B, system 100 includes a computing device 102 that includes first browser 104 and a second browser 106. First browser 104 includes a first render engine 120 and a multi-browser tab manager 108, and has an open browser window 110. Second browser 106 includes a second render engine 122 and a host browser interface 112. In FIG. 1A, second browser 106 has invoked a running instance (or process) of itself, referred to as second browser (first instance) 106A. Furthermore, browser window 110 includes a tab 114 displaying a first page 116 that is rendered by second render engine 122 of second browser (first instance) 106A. In FIG. 1B, no instance of second browser 106 executes. Instead, tab 114 displays a second page 118 rendered by first render engine 120 of first browser 104. FIGS. 1A and 1B are further described as follows.

Computing device 102 is a computing device via which a user is enabled to run applications and visit web pages compatible with various web browsers. Computing device 102 may be any type of mobile computing device, such as a Microsoft® Surface® device, a personal digital assistant (PDA), a laptop computer, a notebook computer, a tablet computer such as an Apple iPad™, a netbook, a smart phone (such as an Apple iPhone, a phone implementing the Google® Android™ operating system, etc.), a wearable computing device (e.g., a head-mounted device including smart glasses such as Google® Glass™, a virtual headset such as Oculus Rift® by Oculus VR, LLC or HoloLens® by Microsoft Corporation, etc.), a stationary computing device such as a desktop computer or PC (personal computer), or other browser-enabled device.

First browser 104 and second browser 106 are web browsers, which are software applications configured for accessing information on the World Wide Web. For instance, first browser 104 and second browser 106 may be configured to receive links to web pages, to retrieve the web pages at the addresses indicated by the links, and to render pages for display to a user of computing device 102. Examples of first browser 104 and second browser 106 include Internet Explorer® or Microsoft Edge®, both developed by Microsoft Corp. of Redmond, Wash., Mozilla Firefox®, developed by Mozilla Corp. of Mountain View, Calif., Safari®, developed by Apple Inc. of Cupertino, Calif., and Google® Chrome™ developed by Google Inc. of Mountain View, Calif. In embodiments, first and second browsers 104 and 106 are different from each other. For instance, first and second browsers 104 and 106 may be different web browser types (e.g., Google® Chrome™ and Microsoft Edge®). Alternatively, first and second browsers 104 and 106 may be different versions of a same web browser. Moreover, second browser 106 may be integrated into and considered to be a component of an operating system executing on computing device 102.

As shown in FIGS. 1A and 1B, second browser 106 comprises a host browser interface 112 and a multi-tab manager 128. Multi-tab manager 128 (also referred to as the browser frame layer) may be configured to manage one or more tabs (e.g., tab 126). Tab 126 may comprise a web browser control 124 and/or other layers of functionality. Web browser control 124 (also referred to as WebOC) enables browsing, document viewing, and data downloading capabilities to second browser 106. It enables the user to browse sites via the Internet, as well as folders in the local file system of computing device 102 and on a network. Web browser control 124 supports Web browsing through both point-and-click hyperlinking and uniform resource locator (URL) navigation. Web pages shown via multi-tab manager 128, tab 126, and/or web browser control 124 are rendered via second render engine 122.

First render engine 120 and second render engine 122 of first browser 104 and second browser 106, respectively, are each configured to generate a display of content in browser tabs of browser windows, including transforming HTML (hypertext markup language) documents and other resources of a web page into an interactive visual representation. In an embodiment, each of first and second engines 120 and 122 may be configured to perform page layout and rendering of content. Examples of browser engines include Gecko™ used in the Mozilla Firefox® web browser, the WebKit™ engine used by the Apple Safari browser, Trident™ (MSHTML) used in Internet Explorer™, and Blink™ used in the Google Chrome and Microsoft Edge Browsers.

Note that second browser 106 shown in dotted line represents the executable file(s) for second browser 106 that may be invoked to generate executing instances (or processes) of second browser 106, such as second browser (first instance) 106A shown in FIG. 1A. It is noted that executing instances of second browser 106 do include host browser interface 112, multi-tab manager 128, tab 126, web browser control 124, and second render engine 122, even though they are not shown illustrated in such instances for reasons of brevity.

As described above, web pages may be compatible with some browsers but not others. For instance, first page 116 may be compatible with second browser 106 but not compatible with first browser 104. In such case, an instance of second browser 106, such as second browser (first instance) 106A of FIG. 1A, may be invoked to render first page 116 within browser window 110 of first browser 104. In this way, pages compatible with second browser 106, but not with first browser 104, may still be displayed to users within first browser 104 without opening a separate browser window for second browser 106, thus providing an improved user experience. This may be accomplished in various ways.

In particular, first browser 104 includes multi-browser tab manager 108. Multi-browser tab manager 108 is configured to receive navigation requests to pages of web applications and determine whether a page to which such a request is directed is compatible with second browser 106 but not first browser 104, such as by conferring with a browser compatibility list. The browser compatibility list may list particular items of content, web applications, file extensions, and/or other identifiers for content that second browser 106 is compatible with (e.g., is capable of rendering) and that first browser 104 is not compatible with. If multi-browser tab manager 108 determines that a requested page is compatible with first browser 104 (e.g., is not identified in the browser compatibility list as incompatible with first browser 104), then first browser 104 receives the web address and renders the page within first browser 104 as normal. However, if multi-browser tab manager 108 determines that the page is compatible with second browser 106, but not first browser 104 (e.g., is identified in the browser compatibility list as compatible with second browser 106 but incompatible with first browser 104), then second browser (first instance) 106A is invoked to receive the web address of the page and to render the page within first browser 104.

For example, an interface of multi-browser tab manager 108 of first browser 104 may issue an invocation request (e.g., an API call) to second browser 106 that causes second browser (first instance) 106A to be invoked and to be hosted by first browser 104. The invocation request may include one or more parameters (e.g., command line parameter(s)) that cause second browser (first instance) 106A to load host browser interface 112. For instance, the parameter(s) may specify the name of host browser interface 112 and/or a location from which to load host browser interface 112. The invocation request may be sent via an API call, or in another manner, which when received by second browser 106, causes second browser 106 to invoke second browser (first instance) 106A. Host browser interface 112 may be hooked into multi-tab manager 128, thereby providing the functionality of multi-tab manager 128, tab 126, web browser control 124 and/or second render engine 122 within first browser 104. Such functionality includes, but is not limited to, virtual tab (or "vtab" switching), browser helper objects (BHOs), and/or other extensions. Vtab switching is functionality that enables content launched in a new tab to appear to be rendered in the same tab from which the new tab was launched. For example, suppose a web page in a first secure container (e.g., an enterprise's private webpage) displays a URL for a web page hosted by a second secure container (e.g., a public web page hosted externally to the enterprise network). When the URL is clicked on, a new tab is launched to display the content of the web page corresponding to the URL. However, with vtab switching, it is made to appear as is if the web page is being rendered in the same tab in which the enterprise web page is rendered. Host browser interface 112 may be implemented as a dynamic link library (DLL), which is loaded into the process of second browser's (first instance) 106A (e.g., from a DLL library stored on computing device 102) in response to first browser 104 invoking second browser 106.

Note that when second browser (first instance) 106A is invoked, second browser (first instance) 106A does not open a browser window as normally would occur. Instead, such a browser window opening is suppressed. The invocation request may include a parameter specifying that second browser (first instance) 106A does not open a browser window, but instead instructing second browser (first instance) 106A to direct any rendering and/or contextual information for a page to first browser 104, so the page may be opened in the open tab of first browser 104 in which the initial navigation request was received. The rendering information and/or contextual information may be provided to first browser 104 via host browser interface 112.

Host browser interface 112 of second browser (first instance) 106A may be further configured to receive navigation requests inside pages opened by second browser (first instance) 106A in tab 114, and determine whether pages to which such requests are directed are compatible with second browser 106 but not first browser 104. For instance, host browser interface 112 may confer with a browser compatibility list to make the determination. The browser compatibility list accessed by host browser interface 112 may be the same page compatibility used by multi-browser tab manager 108 or a different one. Upon determination that a page is compatible with second browser 106 and not first browser 104, host browser interface 112 renders the page hosted within tab 114 of first browser 104, again without opening a browser window for second browser (first instance) 106A.

For instance, as shown in FIG. 1A, first page 116 was determined to be compatible with second browser 106, but not first browser 104. As such, browser window 110 of first browser 104 displays first page 116 within tab 114, rendered there by second render engine 122 of second browser (first instance) 106A. Alternatively, as shown in FIG. 1B, a second page 118 (opened from a link within first page 116, or by a history navigation) was determined to be compatible with first browser 104. As such, browser window 110 displays second page 118 within tab 114, rendered there by first render engine 120. In the case of FIG. 1B, because second page 118 is compatible with first browser 104, second browser (first instance) 106A is not needed and may therefore be closed, thereby freeing up memory and reducing processor demand in computing device 102.

Accordingly, pages may be opened in tab 114 by first browser 104 or instances of second browser 106, depending on browser capability for the pages, in any page sequence.

Figure 2:
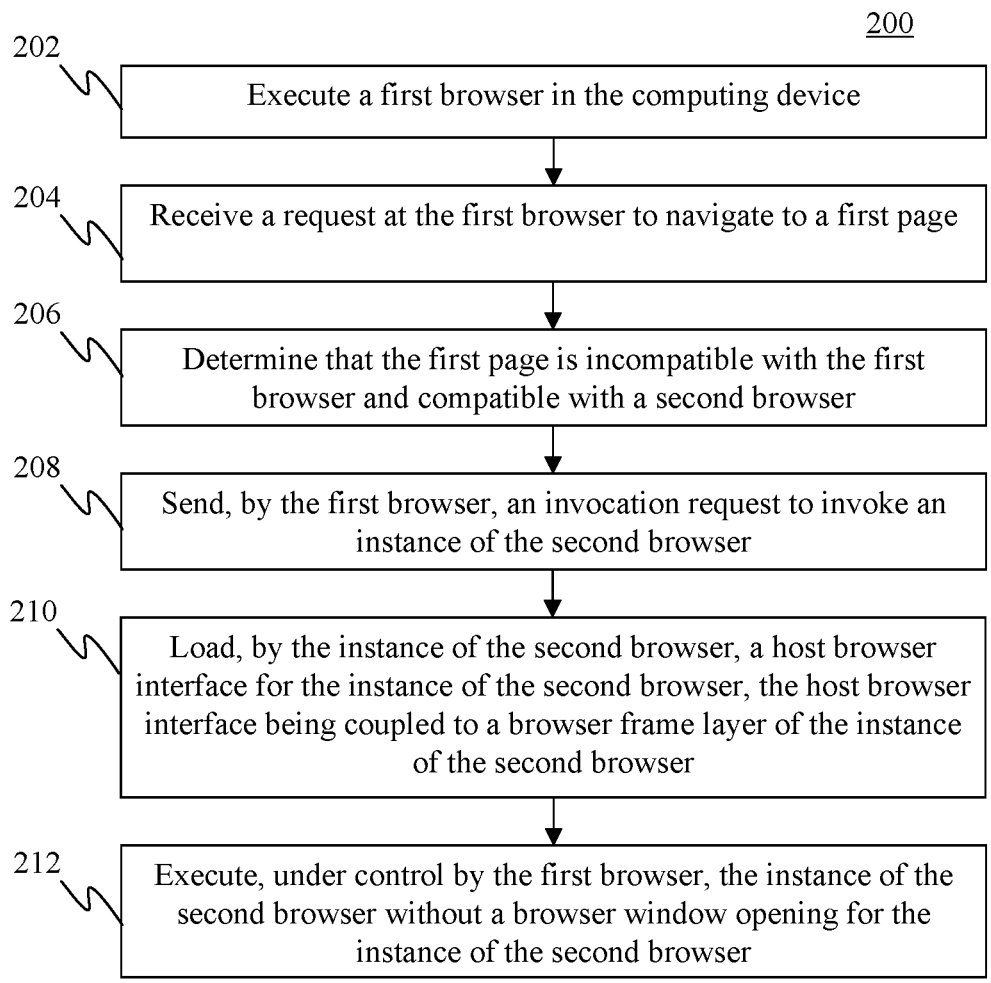
FIG. 2 shows a flowchart of a method in a computing device for hosting a browser within another browser in accordance with an example embodiment.

FIG. 2 shows a flowchart 200 of a method in a computing device for hosting a browser within another browser, according to an example embodiment. In an embodiment, flowchart 200 may be implemented by multi-browser tab manager 108 of first browser 104. For purposes of illustration, flowchart 200 is described with continued reference to FIG. 1. Other structural and operational embodiments will be apparent to persons skilled in the relevant art(s) based on the following discussion.

Flowchart 200 of FIG. 2 begins with step 202. In step 202, a first browser is executed in the computing device, the first browser having an open browser window. For instance, as shown in FIG. 1A, first browser 104 executes in computing device 102. First browser 104 has browser window 110 open. In embodiments, a user of computing device 102 may have invoked first browser 104, or first browser 104 may have been invoked by the invocation of a web application.

In step 204, a request is received at the first browser to navigate to a first page. For instance, and with reference to FIG. 1A, multi-browser tab manager 108 may receive a request to navigate to first page 116. In embodiments, the navigation request may be initiated by a user of computing device 102, such as by a link click in a currently opened page in tab 114 or other open tab (causing tab 114 to open), or by a history navigation (e.g., by the user selecting a browser back button or forward button) with tab 114 the active tab. The navigation request includes an address to first page 116, such as in the form of a uniform resource location (URL) or other address type.

In step 206, a determination is made that the first page is incompatible with the first browser and compatible with a second browser. In an embodiment, multi-browser tab manager 108 may be configured to determine that first page 116 is compatible with second browser 106 and incompatible with first browser 104.

In embodiments, multi-browser tab manager 108 may determine that the first page is compatible with the first browser or the second browser based on an administrator defined list, such as by accessing a browser compatibility list as described above. However, this is not intended to be limiting and multi-browser tab manager 108 may make this determination in other ways, as would be apparent to persons skilled in the relevant art(s) from the teachings herein.

In step 208, the first browser sends an invocation request to invoke an instance of the second browser. For example, with reference to FIG. 1A, multi-browser tab manager 108 may send an invocation request to second browser 106. For instance, invocation request may be sent via an API call, and second browser 106 may include an API interface configured to receive the API call.

In step 210, responsive to receiving the invocation request, a host browser interface for the instance of the second browser is loaded by the instance of the second browser, the host browser interface being coupled to a browser frame layer of the instance of the second browser. For example, with reference to FIG. 1A, responsive to receiving the invocation request, host browser interface 112 for second browser (first instance) 106A is loaded by second browser (first instance) 106A. Host browser interface 112 is coupled to browser frame layer 128 of second browser (first instance) 106A, thereby enabling first browser 104 to host the functionality of browser frame layer 128, tab 126, web browser control 124 and/or second render engine 122.

In step 212, the instance of the second browser is executed under control by the first browser without a browser window opening for the instance of the second browser. For example, with reference to FIG. 1A, second browser (first instance) 106A is executed under control by first browser 104 without a browser window opening for second browser (first instance) 106A.

In accordance with one or more embodiments, an address of the first page is provided to the instance of the second browser, and the instance of the second browser renders the first page, the first page being hosted within a tab in the browser window of the first browser. For example, with reference to FIG. 1A, an address of first page 116 is provided to second browser (first instance) 106A, and second browser (first instance) 106A renders first page 116 within tab 114 in browser window 110 of first browser 104.

In accordance with one or more embodiments, host browser interface 112 is a DLL loaded at initialization of second browser (first instance) 106A.

In accordance with one or more embodiments, functionality of the instance of the second browser is hosted within the first browser, the functionality including at least one of virtual tab switching, browser helper objects, and one or more browser extensions.

As described above, second browser (first instance) 106A provides rendering information and/or contextual information for a page being rendered by second render engine 122 to first browser 104. The information is utilized by first browser 104 to provide a visual experience to the user in which the web page is being hosted by first browser 104, even though it is in fact being hosted by second browser (first instance) 106A. The foregoing is described below.

A. Navigation URLs

Suppose a user viewing a web page (via second browser (first instance) 106A) that includes a URL to another web page (e.g., another incompatible web page). When a user clicks on the URL, first browser 104 may indicate URL in its address bar. Thus, in accordance with an embodiment, host browser interface 114 provides the URL to first browser 104 upon the user clicking on the URL and/or upon second browser (first instance) 106A navigating to that URL. In response to receiving the URL, first browser 104 causes the URL to be displayed in its address bar. Additional information may also be provided to first browser 104. For instance, if the web page associated with the URL is secure (e.g., the web page utilizes a Secure Socket Layer (SSL) or Transport Layer Security (TLS)), host browser interface 112 may provide an indication to first browser 104 that the web page is secure, and first browser 104 may reflect this via its GUI. For instance, first browser 104 may display "https://" before the URL in its address bar. In another example, first browser 104 may display a lock icon via its GUI.

Similarly, when first browser 104 invokes second browser 106 to render an incompatible web page, first browser 104 provides the URL (and/or additional information, such as security information) to second browser 106. First browser 104 may also provide a listing of URLs that were traversed via first browser 104 to host browser interface 112 of second browser (first instance) 106A, and second browser (first instance) 106 may provide a listing of URLs that were traversed via second browser (first instance) 106 to first browser 104. This enables first browser 104 and/or second browser (first instance) 106 to perform a navigation of history of URLs traversed by both first browser 104 and/or second browser (first instance) 106. Additional details regarding the foregoing techniques is described in application Ser. No. 16/403,186, filed on May 3, 2019, and entitled "Page Display by Hosted Browser Within Controlling Browser," the entirety of which is incorporated by reference.

Figure 3:
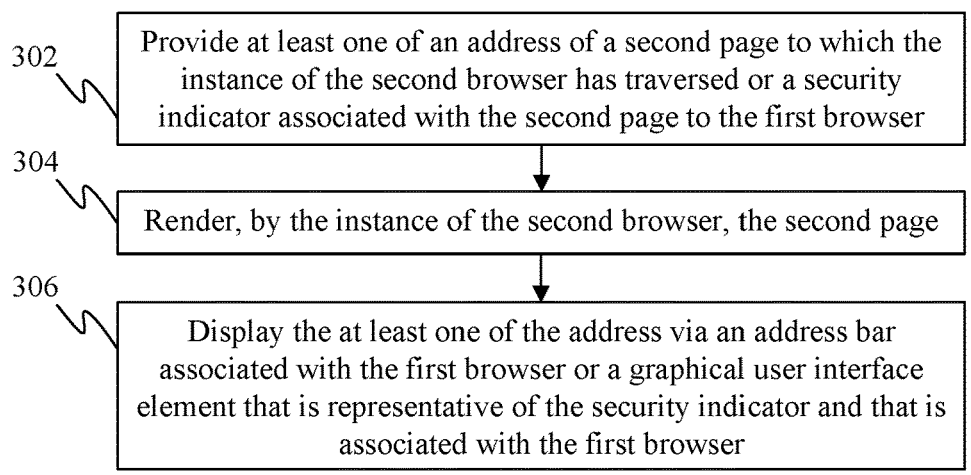
FIG. 3 shows a flowchart of a method for displaying, by a first browser, a navigation URL and/or a security indicator received from a second browser in accordance with an example embodiment.
Figure 4:
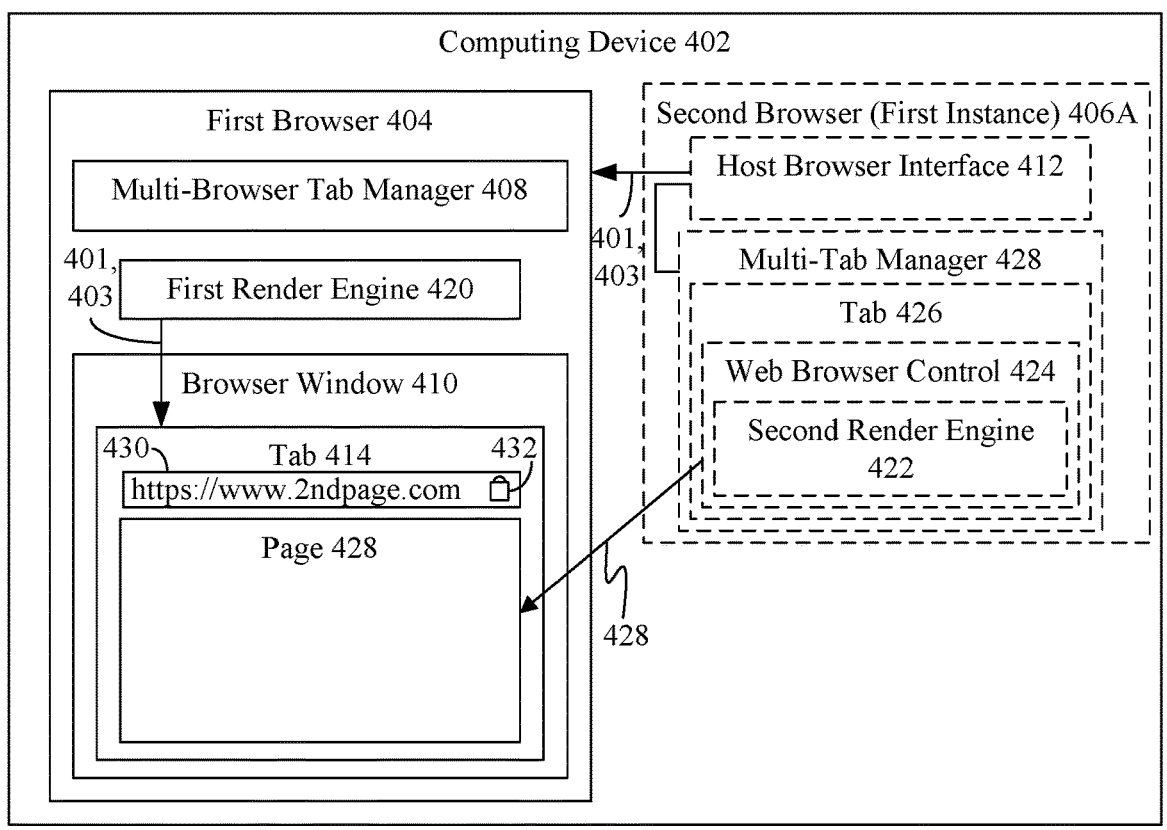
FIG. 4 shows a block diagram of a system for displaying, by a first browser, a navigation URL and/or a security indicator received from a second browser in accordance with an example embodiment.

FIG. 3 shows a flowchart 300 of a method for displaying, by a first browser, a navigation URL and/or a security indicator received from a second browser in accordance with an example embodiment. In an embodiment, flowchart 300 may be implemented by a system 400 shown in FIG. 4, although the method is not limited to that implementation. As shown in FIG. 4, system 400 includes a computing device 402 that includes first browser 404 and an instance of second browser 406A. First browser 404 includes a first render engine 420 and a multi-browser tab manager 408, and has an open browser window 410 that includes one or more tabs (e.g., tab 414). Second browser 406A includes a multi-tab manager 428, second render engine 422 and a host browser interface 412. Multi-tab manager 428 may be configured to manage one or more tabs (e.g., tab 426). Tab 426 may comprise a web browser control 424 and/or other layers of functionality. Second render engine 422 may be managed by web browser control 424. Computing device 402, first browser 404, multi-browser tab manager 408, first render engine 420, browser window 410, tab 414, second browser (first instance) 406A, host browser interface 412, multi-tab manager 428, tab 426, web browser control 424, and second render engine 422 are examples of computing device 102, first browser 104, multi-browser tab manager 108, first render engine 120, browser window 110, tab 114, second browser (first instance) 106A, host browser interface 112, multi-tab manager 128, tab 126, web browser control 124, and second render engine 122, as respectively described above with reference to FIGS. 1A and 1B. In the embodiment shown in FIG. 4, second browser (first instance) 406A has traversed to another web page (e.g., page 428), for example, via a user clicking on a hyperlink displayed on a first page (e.g., page 116, shown in FIG. 1A).

Flowchart 300 begins with step 302. In step 302, at least one of an address of a second page to which the instance of the second browser has traversed or a security indicator associated with the second page is provided to the first browser. For example, with reference to FIG. 4, second browser (first instance) 406A provides at least one of an address (e.g., a URL) 401 of a second page or a security indicator 403 associated with the second page to first browser 404 via host browser interface 412

In step 304, the second page is rendered by the instance of the second browser, the second page being hosted within the tab in the browser window of the first browser. For example, with reference to FIG. 4, second render engine 422 of second browser (first instance) 406A renders second page 428. Second page 428 is hosted within tab 414 of browser window 410 of first browser 404.

In step 306, the at least one of the address via an address bar associated with the first browser or a graphical user interface element that is representative of the security indicator and that is associated with the first browser is displayed. For example, with reference to FIG. 4, first render engine 420 renders address 401 (e.g., https://www.2ndpage.com) via an address bar 430 displayed via tab 414 and/or renders a graphical user interface element 432 that is representative of the security indicator 403 within address bar 430. In the example shown in FIG. 4, security indicator 430 indicates that second page 428 is a secure website. Accordingly, graphical user interface element 432 (which is shown as a lock) represents that second page 428 is secure. First render engine 420 renders its version of the lock, and not the version of the lock (or graphical user interface element used by second browser (first instance) 406A to represent a secure website) utilized by second browser (first instance) 606A, thereby enabling a seamless integration of second browser (first instance) 406A within first browser 404.

B. User Interface Element Control

Referring again to FIG. 1, in accordance with an embodiment, host browser interface 112 may provide status information to first browser 104. The status information may indicate whether a web page being loaded and/or rendered by second render engine 112 is large in size and/or is taking a long time to load. Based on the status information, first browser 104 causes a user interface element to be rendered to indicate the status. For example, the user interface element may be a spinning wheel or ring (also referred to as a "throbber") utilized by first browser 104. The user interface element utilized by second browser (first instance) 106A to reflect this status (i.e., the second browser's version of the throbber) is not displayed. Instead, the user interface element utilized by first browser 104 is utilized.

In another example, the status information may indicate whether a web page being loaded and/or rendered by second render engine 112 is favorited by the user. Based on this information, first browser 104 causes a user interface element to be rendered to indicate the favorited status. For example, the user interface element may be a star shown in the address bar of first browser 104. The user interface element utilized by second browser (first instance) 106A to reflect this status (i.e., the second browser's version of the star) is not displayed. Instead, the user interface element utilized by first browser 104 is utilized. The foregoing techniques advantageously enables a seamless integration of second browser (first instance) 106A within first browser 104.

It is noted that the status information described above is purely exemplary and that the status information may include any type of information that first browser 104 utilize to display its own version of a particular user interface element.

Figure 5:
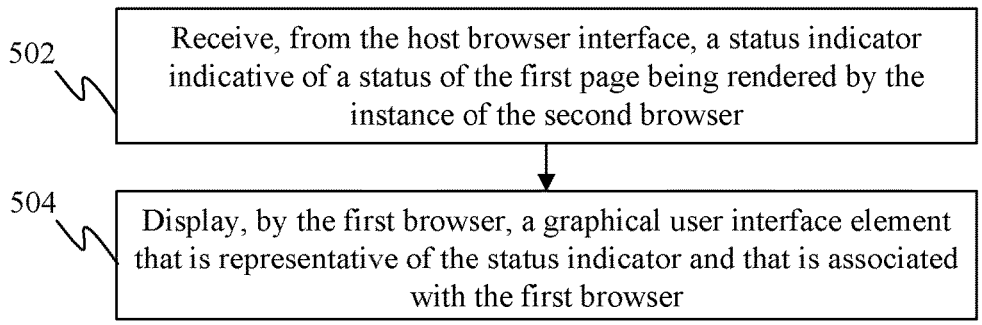
FIG. 5 shows a flowchart of a method for displaying, by a first browser, a graphical user interface element based on a status indicator received from a second browser in accordance with an example embodiment.
Figure 6:
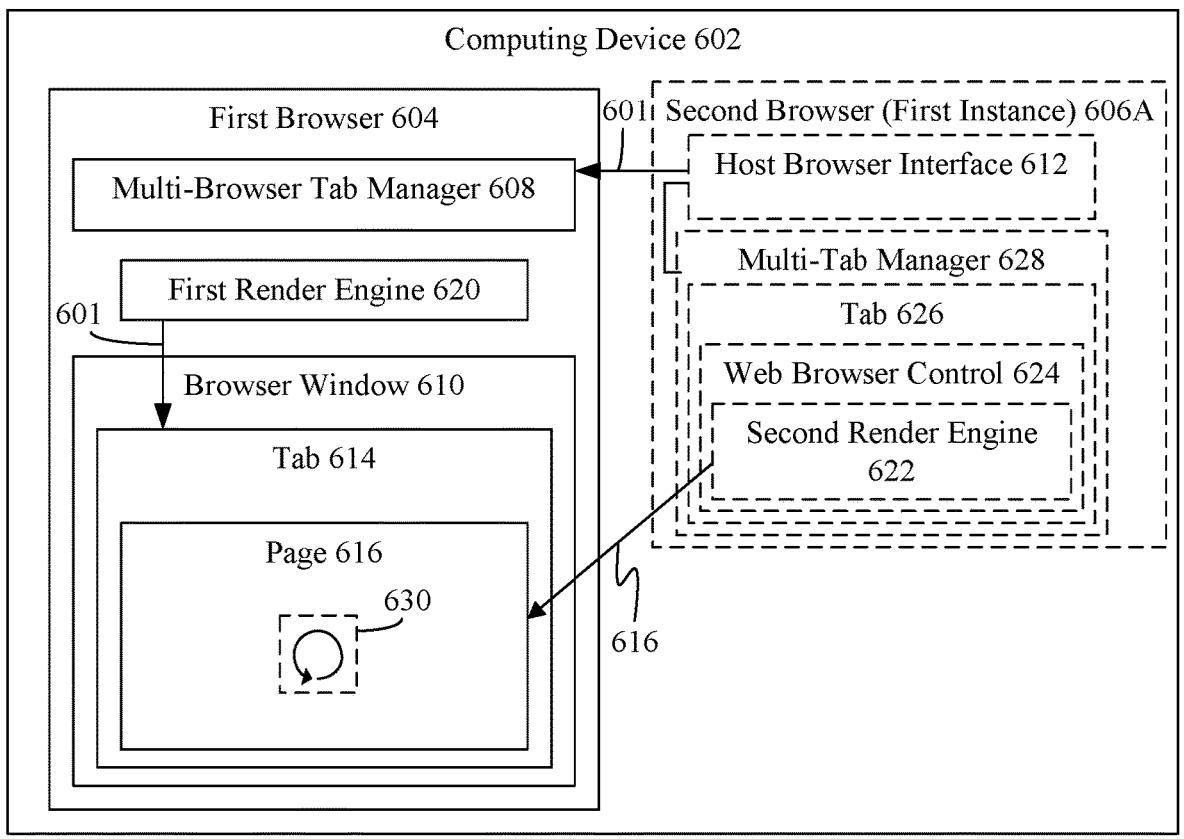
FIG. 6 shows a block diagram of a system for displaying, by a first browser, a graphical user interface element based on a status indicator received from a second browser in accordance with an example embodiment.

FIG. 5 shows a flowchart 500 of a method for displaying, by a first browser, a graphical user interface element based on a status indicator received from a second browser in accordance with an example embodiment. In an embodiment, flowchart 500 may be implemented by a system 600 shown in FIG. 6, although the method is not limited to that implementation. As shown in FIG. 6, system 600 includes a computing device 602 that includes first browser 604 and an instance of second browser 606A. First browser 604 includes a first render engine 620 and a multi-browser tab manager 608, and has an open browser window 610 that includes one or more tabs (e.g., tab 614). Second browser 606A includes a multi-tab manager 628, second render engine 622 and a host browser interface 612. Multi-tab manager 628 may be configured to manage one or more tabs (e.g., tab 626). Tab 626 may comprise a web browser control 624 and/or other layers of functionality. Second render engine 622 may be managed by web browser control 624. Computing device 602, first browser 604, multi-browser tab manager 608, first render engine 620, browser window 610, tab 614, second browser (first instance) 606A, host browser interface 612, multi-tab manager 628, tab 626, web browser control 624, and second render engine 622 are examples of computing device 102, first browser 104, multi-browser tab manager 108, first render engine 120, browser window 110, tab 114, second browser (first instance) 106A, host browser interface 112, multi-tab manager 128, tab 126, web browser control 124, and second render engine 122, as respectively described above with reference to FIGS. 1A and 1B. In the embodiment shown in FIG. 6, second browser (first instance) 606A has traversed to a first page (e.g., page 616). Page 616 is an example of page 116, as described above with reference to FIG. 1A.

Flowchart 500 begins with step 502. In step 502, a status indicator indicative of a status of the first page being rendered by the instance of the second browser is received from the host browser interface. For example, with reference to FIG. 6, second browser (first instance) 606A provides a status indicator 601 indicative of a status of page 616 being rendered by second render engine 622 of second browser (first instance) 606A via host browser interface 612.

In step 504, a graphical user interface element that is representative of the status indicator and that is associated with first browser is displayed. For example, with reference to FIG. 6, first render engine 620 displays a graphical user interface element 630 representative of status indicator 601 and that is associated with first browser 604. For example, status indicator 601 may indicate that page 616 is taking a long time to load. Accordingly, first render engine 620 displays a throbber (i.e., graphical user interface element 630) in tab 614 to indicate to the user that page 616 is loading. First render engine 620 renders its version of the throbber, and not the version of the throbber utilized by second browser (first instance) 606A, thereby enabling a seamless integration of second browser (first instance) 606A within first browser 604, C. Watchdog Process Referring again to FIG. 1A, during initialization of second browser (first instance) 106A, a watchdog process may be launched. The watchdog process may be configured to determine whether first browser 104 is still active (or open). For instance, during initialization first browser 104 may provide its process identification (PID) to second browser (first instance) 106A via host browser interface 112. The watchdog process may periodically monitor the PID to determine whether it is still pointing to first browser 104. In the event that the PID is no longer pointing to first browser 104 (e.g., due to first browser 104 being closed due to first browser 104 self-terminating or crashing, etc.), the watchdog process may cause second browser (first instance) 106A to terminate.

Figure 7:
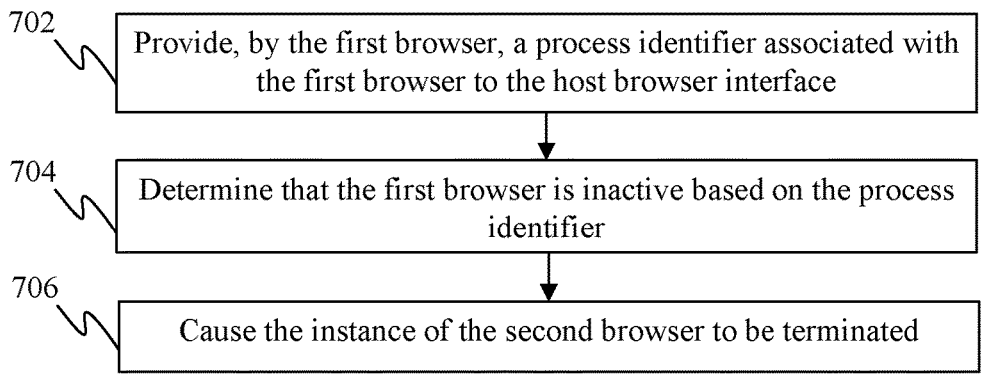
FIG. 7 shows a flowchart of a method for monitoring a first browser in accordance with an example embodiment.
Figure 8:
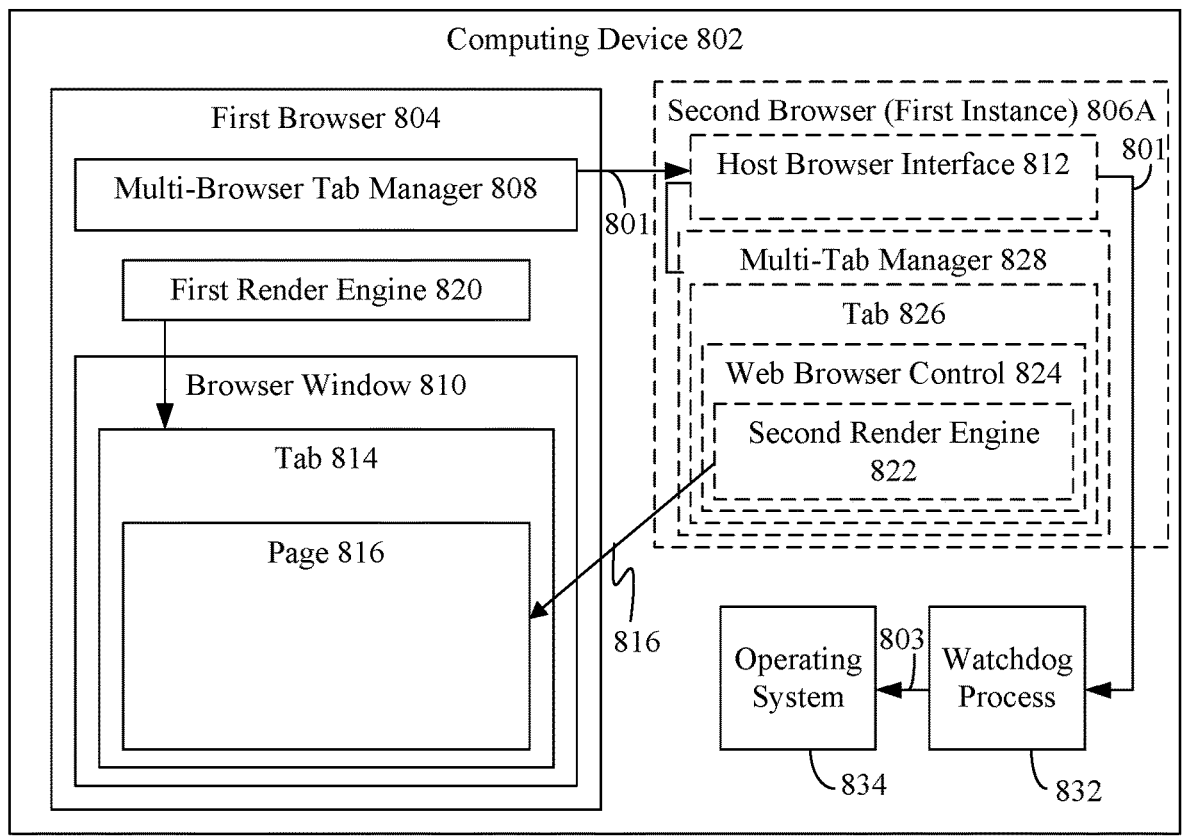
FIG. 8 shows a block diagram of a system for monitoring a first browser in accordance with an example embodiment.

FIG. 7 shows a flowchart 700 of a method for monitoring a first browser in accordance with an example embodiment. In an embodiment, flowchart 700 may be implemented by a system 800 shown in FIG. 8, although the method is not limited to that implementation. As shown in FIG. 8, system 800 includes a computing device 802 that includes first browser 804 and an instance of second browser 806A. First browser 804 includes a first render engine 820 and a multi-browser tab manager 808, and has an open browser window 810 that includes one or more tabs (e.g., tab 814). Second browser 806A includes a multi-tab manager 828, second render engine 822 and a host browser interface 812. Multi-tab manager 828 may be configured to manage one or more tabs (e.g., tab 826). Tab 826 may comprise a web browser control 824 and/or other layers of functionality. Second render engine 822 may be managed by web browser control 824. Computing device 802, first browser 804, multi-browser tab manager 808, first render engine 820, browser window 810, tab 814, second browser (first instance) 806A, host browser interface 812, multi-tab manager 828, tab 826, web browser control 824, and second render engine 822 are examples of computing device 102, first browser 104, multi-browser tab manager 108, first render engine 120, browser window 110, tab 114, second browser (first instance) 106A, host browser interface 112, multi-tab manager 128, tab 126, web browser control 124, and second render engine 122, as respectively described above with reference to FIGS. 1A and 1B. In the embodiment shown in FIG. 8, second browser (first instance) 806A has traversed to a first page (e.g., page 816). Page 816 is an example of page 116, as described above with reference to FIG. 1A. As further shown in FIG. 7, computing device 802 may also comprise a watchdog process 830 and an operating system 832. Watchdog process 830 and operating system 832 execute on computing device 802. Watchdog process 830 may be initiated responsive to first browser 804 being initiated.

Flowchart 700 begins with step 702. In step 702, a process identifier associated with the first browser is provided to the host browser interface by the first browser. For example, with reference with FIG. 8, first browser 804 provides a process identification (e.g., PID 801) to host browser interface 812 of second browser (first instance) 806A.

In step 704, a determination is made that the first browser is inactive based on the process identifier. For example, with reference to FIG. 8, host browser interface 812 provides PID 801 to watchdog process 830. Watchdog process 830 may periodically monitor PID 801 to determine whether it is still pointing to first browser 804. Watchdog process 830 determines that first browser 804 is inactive when PID 801 is no longer pointing to first browser 804 (e.g., due to first browser 804 being closed due to first browser 104 self-terminating or crashing, etc.). Watchdog process 830 may receive the value of PID 801 continuously, or may check a value of PID 801 periodically or according to any other schedule.

In step 706, in response to determining that the first browser is no longer active, the instance of the second browser is caused to be terminated. For example, with reference to FIG. 8, in response to determining that first browser 804 is no longer active, watchdog process 830 provides a command 803 to operating system 832. Responsive to receiving command 803, operating system 832 terminates second browser (first instance) 806A.

D. Accelerator Handling

Referring again to FIG. 1A, accelerator handling starts with a keydown message on whatever thread has focus and iterates through various accelerator tables until a match is found, in which case it is 'handled' and the search for other matching accelerators stops. If an accelerator (also referred to as keyboard shortcuts, such as, but not limited to, Ctrl+C (to copy text), Ctrl+P (to paste text), etc.) is not handled, it will be forwarded to other threads to loop through more accelerator tables for handling until there are no threads left or it gets handled. An unhandled keydown accelerator is converted to a character and goes through another accelerator handling process before the character is delivered to the focused window.

Second browser (first instance) 106A may define an accelerator as any key press, release or character when the "Ctrl" "Alt", or "F1-F24" keys are pressed, and has special casing for handling key presses like "Tab" and "Esc."

There may be multiple threads per window that handle accelerators, for example, the tab thread (e.g., tab 126), the frame thread of second browser 106 (e.g., multi-tab manager 128) and the frame thread of first browser 104 (e.g., multi-browser tab manager 108). The thread that receives accelerator input is based on which window associated with the thread is in focus. For instance, if a web page is being rendered by second render engine 122 and the window in which the web page is being rendered is active, then that window will receive the accelerator input. Similarly, if a web page is being rendered by first render engine 120 and the window in which the web page is being rendered is active, then that window will receive the accelerator input.

If a window associated with second browser (first instance) 106A receives accelerator input, second browser (first instance) 106A may perform a particular action depending on the accelerator input received. For instance, in a scenario in which second browser (first instance) 106A is running in a standalone mode (i.e., it is not invoked by first browser 104), if the accelerator input matches accelerator input in a mapping for second browser (first instance) 106A, then second browser (first instance) 106A handles the accelerator input and performs the action corresponding to the accelerator input (as specified in the mapping). If there is no match, then second browser (first instance) 106A drops the accelerator input.

In a scenario in which first browser 104 invokes second browser (first instance) 106A, host browser interface 112 may provide the accelerator input to first browser 104, and first browser 104 determines whether the accelerator input matches accelerator input in a mapping for first browser 104. If the accelerator input matches accelerator input in a mapping for first browser 104, then first browser 104 handles the accelerator input and performs the action corresponding to the accelerator input (as specified in the mapping). If there is no match, then first browser 104 drops the accelerator input.

In accordance with an embodiment, the accelerator input for a particular action performed by second browser (first instance) 106A does not match the accelerator input for the same particular action performed by first browser 104. In accordance with such an embodiment, first browser 104 may translate accelerator input received from second browser (first instance) 106A into the accelerator input accepted by first browser 104 for that same action.

Figure 9:
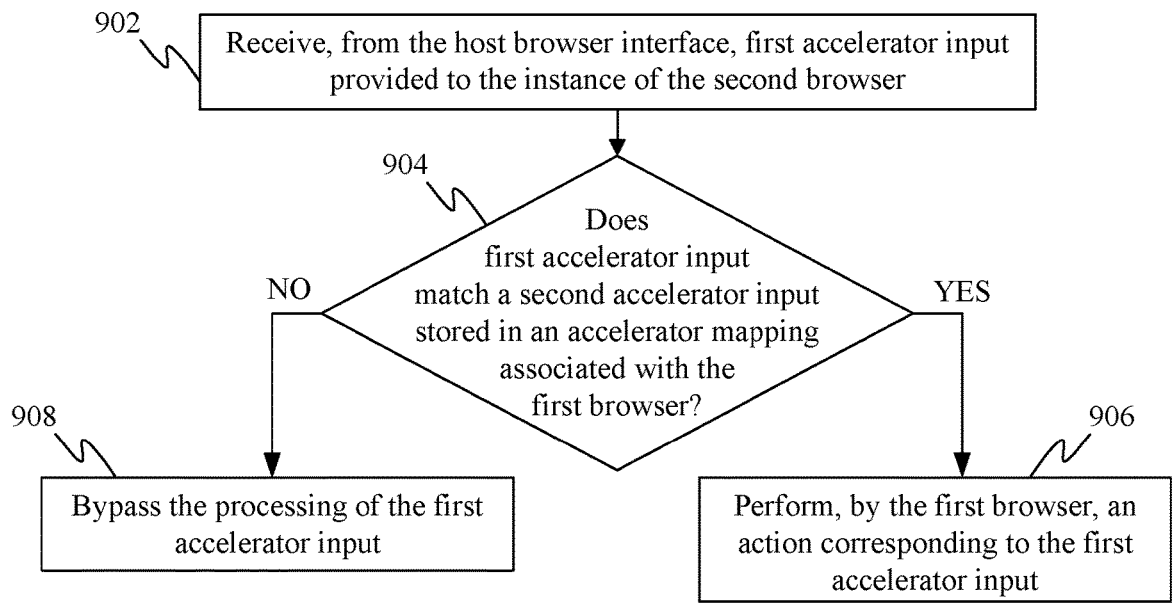
FIG. 9 shows a flowchart of a method for handing, by a first browser, accelerator input received from a second browser in accordance with an example embodiment.
Figure 10:
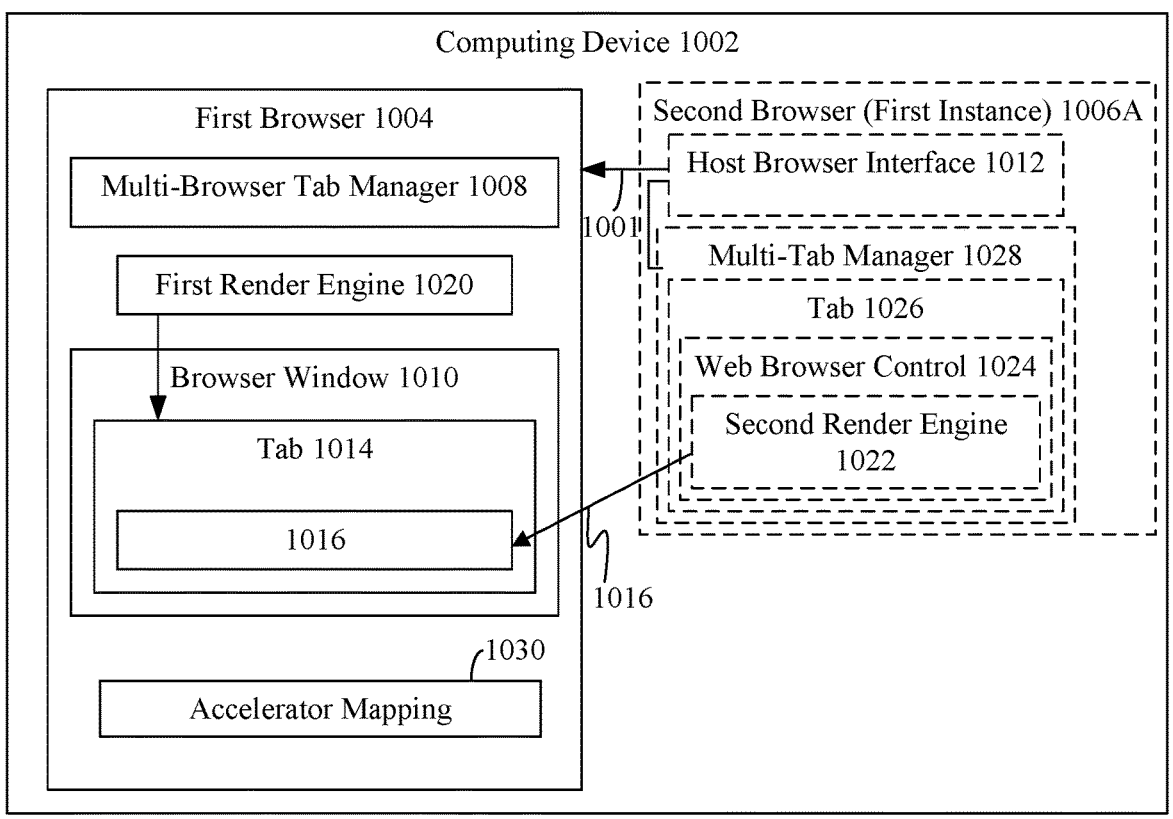
FIG. 10 shows a block diagram of a system for handing, by a first browser, accelerator input received from a second browser in accordance with an example embodiment.

FIG. 9 shows a flowchart 900 of a method for handing, by a first browser, accelerator input received from a second browser in accordance with an example embodiment. In an embodiment, flowchart 900 may be implemented by a system 1000 shown in FIG. 10, although the method is not limited to that implementation. As shown in FIG. 10, system 1000 includes a computing device 1002 that includes first browser 1004 and an instance of second browser 1006A. First browser 1004 includes a first render engine 1020 and a multi-browser tab manager 1008, and has an open browser window 1010 that includes one or more tabs (e.g., tab 1014). Second browser 1006A includes a multi-tab manager 1028, second render engine 1022 and a host browser interface 1012. Multi-tab manager 1028 may be configured to manage one or more tabs (e.g., tab 1026). Tab 1026 may comprise a web browser control 1024 and/or other layers of functionality. Second render engine 1022 may be managed by web browser control 1024. Computing device 1002, first browser 1004, multi-browser tab manager 1008, first render engine 1020, browser window 1010, tab 1014, second browser (first instance) 1006A, host browser interface 1012, multi-tab manager 1028, tab 1026, web browser control 1024, and second render engine 1022 are examples of computing device 102, first browser 104, multi-browser tab manager 108, first render engine 120, browser window 110, tab 114, second browser (first instance) 106A, host browser interface 112, multi-tab manager 128, tab 126, web browser control 124, and second render engine 122, as respectively described above with reference to FIGS. 1A and 1B. In the embodiment shown in FIG. 10, second browser (first instance) 1006A has traversed to a first page (e.g., page 1016). Page 1016 is an example of page 116, as described above with reference to FIG. 1A. As further shown in FIG. 7, first browser 1004 maintains an accelerator mapping 1030. Accelerator mapping 1030 may be a data structure (e.g., a table) that maps different accelerator inputs to different actions.

Flowchart 900 begins with step 902. In step 902, a first accelerator input provided to the instance of the second browser is received from the host browser interface. For example, with reference to FIG. 10, second browser (first instance) 1006A may receive accelerator input (e.g., CTRL+C, CTRL+P, etc.) via an input device utilized by a user (e.g., a keyboard). First browser 1004 receives the accelerator input (shown as accelerator input 1001) from second browser (first instance) 1006A via host browser interface 1012.

In step 904, a determination is made as to whether the first accelerator input matches a second accelerator input stored in an accelerator mapping associated with the first browser. For example, with reference to FIG. 10, first browser 1004 determine whether accelerator input 1001 matches an accelerator input stored in accelerator mapping 1030 associated with first browser 1004. In response to determining that the first accelerator input matches an accelerator input stored in accelerator mapping 1030, flow continues to step 906. Otherwise, flow continues to step 908.

In step 906, the first browser performs an action corresponding to the first accelerator input. For example, with reference to FIG. 10, first browser 1004 performs an action (e.g., copying text, rendering a print dialog screen, etc.) corresponding to first accelerator input 1001.

In step 908, the processing of the first accelerator input is bypassed. For example, with reference to FIG. 10, first browser 1004 bypasses the processing of accelerator input 1001. For example, first browser 1004 ignores or drops accelerator input 1001, as it does not match any of the accelerator inputs maintained by accelerator mapping 1030.

E. User Permissions

Referring again to FIG. 1, first browser 104 and second browser 106 may maintain the same or different models for site permissions—permissions such as allowing/denying popups, allowing certain pages to use your physical location using geolocation APIs, and denying others, etc. For instance, first browser 104 and second browser 106 may not only maintain separate permissions but may have separate models. For example, second browser 106 may enable the user to configure swathes of sites in "zones" to be allowed or disallowed to use popups, and enable the user to individually add other sites to be allowed to provide popups even if it would normally be disallowed, but the user can't make an exception and disallow a site that would normally allow them. First browser 104 may allow the user to make both kinds of exceptions, and also adds the ability to do profile-based permissions, but doesn't really have zone-based permissions.

Embodiments described herein may project the settings of first browser 104 onto second browser (first instance) 106A when second browser (first instance) 106A is hosted by first browser 104, merging second browser 106's notion of zones with first browser 104's notion of user profiles and sophisticated permissions overrides to create a permissions scheme that is compatible with the dual browser scenario. This involves parsing the permissions of first browser 104 for the current profile, transmitting them to host browser interface 112 of second browser (first instance) 106A, merging them with the zone settings of second browser (first instance) 106A, and altering second browser (first instance) 106A to first look up the settings override when operating as an application being hosted by first browser 104. This may be updated dynamically whenever a user changes a setting.

During initialization of second browser 106, first browser 104 may provide its site permission settings (and a version number thereof) to second browser 106 via host browser interface 112. Alternatively, second browser 106 may generate a version number for the received site permission settings. Multi-tab manager 128 may store the settings along with its version number. First browser 104 may provide updated site permission settings to second browser 106 responsive to the user changing the settings. Multi-tab manager 128 may store such updated site permission settings along with an updated version number.

When a content process (e.g., a window in which the web site is being rendered by second render engine 122) requires site permission settings, it may retrieve the settings from multi-tab manager 128 and store them in its own permissions cache. The settings (and version thereof) for a particular user permission may be stored in its own permissions cache.

When a script executing on a particular web site being rendered by second browser (first instance) 106A requests permission from a user (e.g., geolocation permissions), second browser (first instance) 106A may first determine whether it has the most current permission settings. For instance, second browser (first instance) 106A may determine whether the version number maintained by the permissions cache of the content process of second browser (first instance) 106A matches the version number maintained by multi-tab manager 128. If the version numbers match, second browser 106 checks the permission settings in the permissions cache to see if the user has already enabled geolocation sharing. If the version numbers do not match, multi-tab manager 128 may provide the updated configuration settings (and version number thereof) to the corresponding permissions cache.

If the permissions settings indicate that the user has in fact enabled geolocation sharing, then second browser 106 may provide a response indicating as such to the script. However, if permission settings indicate that the user has not enabled geolocation sharing, second browser (first instance) 106 may provide the request to first browser 104 via host browser interface 112. The request may specify the prompt to be displayed to the user. First browser 104 renders a user interface control (e.g., a dialog box) that includes the prompt and one or more user interface elements for responding to the prompt (e.g., a "yes" button, a "no" button, etc.). Upon submitting a response, first browser 104 provides a response indicative of the user's selection to second browser 106 via host browser interface 112. Second browser (first instance) 106A then provides the response to the script. Accordingly, the user interface control utilized by second browser (first instance) 106A to prompt the user for his or her geolocation (i.e., the second browser's version of the prompt) is not displayed. Instead, the user interface control utilized by first browser 104 is utilized. The foregoing techniques advantageously enables a seamless integration of second browser (first instance) 106A within first browser 104.

In another example, second browser (first instance) 106 may provide an indication to first browser 104 (via host browser interface 112) to indicate whether a pop-up has been blocked by second browser 106. Based on this information, first browser 104 causes a user interface element to be rendered to indicate that a pop-up has been blocked and may also enable the user to adjust the pop-up blocking settings with respect to the website from which the pop-up was blocked. The user interface element utilized by second browser (first instance) 106A to reflect this (i.e., the second browser's version of the pop-up blocker indicator) is not displayed. Instead, the user interface element utilized by first browser 104 is utilized. The foregoing techniques advantageously enables a seamless integration of second browser (first instance) 106A within first browser 104.

In accordance with an embodiment, second browser (first instance) 106A may support zone-based security, where each website is categorized based on its website address as belonging to a particular zone, namely, Internet, intranet, trusted, or restricted. Second browser (first instance) 106A uses the zone information for a given site to allow or deny that site the ability to perform some requested functionality. For example, because the Internet zone is considered less secure than the intranet zone, a webpage from the Internet zone is not allowed to display content (e.g., a pop-up), whereas a webpage from an intranet zone is allowed to display content.

In a scenario in which first browser 104 hosts second browser (first instance) 106A, the zone-based security settings may take priority over the settings maintained by first browser 104. For instance, when a permission setting is requested, second browser (first instance) 106A may first determine whether it maintains a zone-based security setting for that permission. If such a setting exists, second browser (first instance) 106A utilizes the setting. If such a setting doesn't exist, then second browser (first instance) 106A utilizes the settings provided by first browser 104.

In accordance with an embodiment, second browser (first instance) 106A may maintain a first permissions cache for use in standalone mode and a second permissions cache for use when first browser 104 hosts second browser (first instance) 106A. When executing in standalone mode, second browser (first instance) 106A accesses the first permissions cache, which stores the permission settings for first browser 106A. When second browser (first instance) 106A is invoked by first browser 104, second browser (first instance) 106A utilizes the second permissions cache, which stores the permission settings of first browser 104.

As indicated above, each permission setting may be associated with its own permission cache. For example, permission settings for geolocation may be maintained in one permission cache, whereas permission settings for pop-up blocking may be maintained in another permission cache. Each of these permission caches may be stored by domain name. For instance, the permission cache for geolocation may store geolocation settings for a plurality of different domain names. The permission cache may be sorted, for example, alphabetically by domain names. In accordance with an embodiment, second browser (first instance) 106A performs a binary search to find permission settings associated with a particular domain name.

Figure 11:
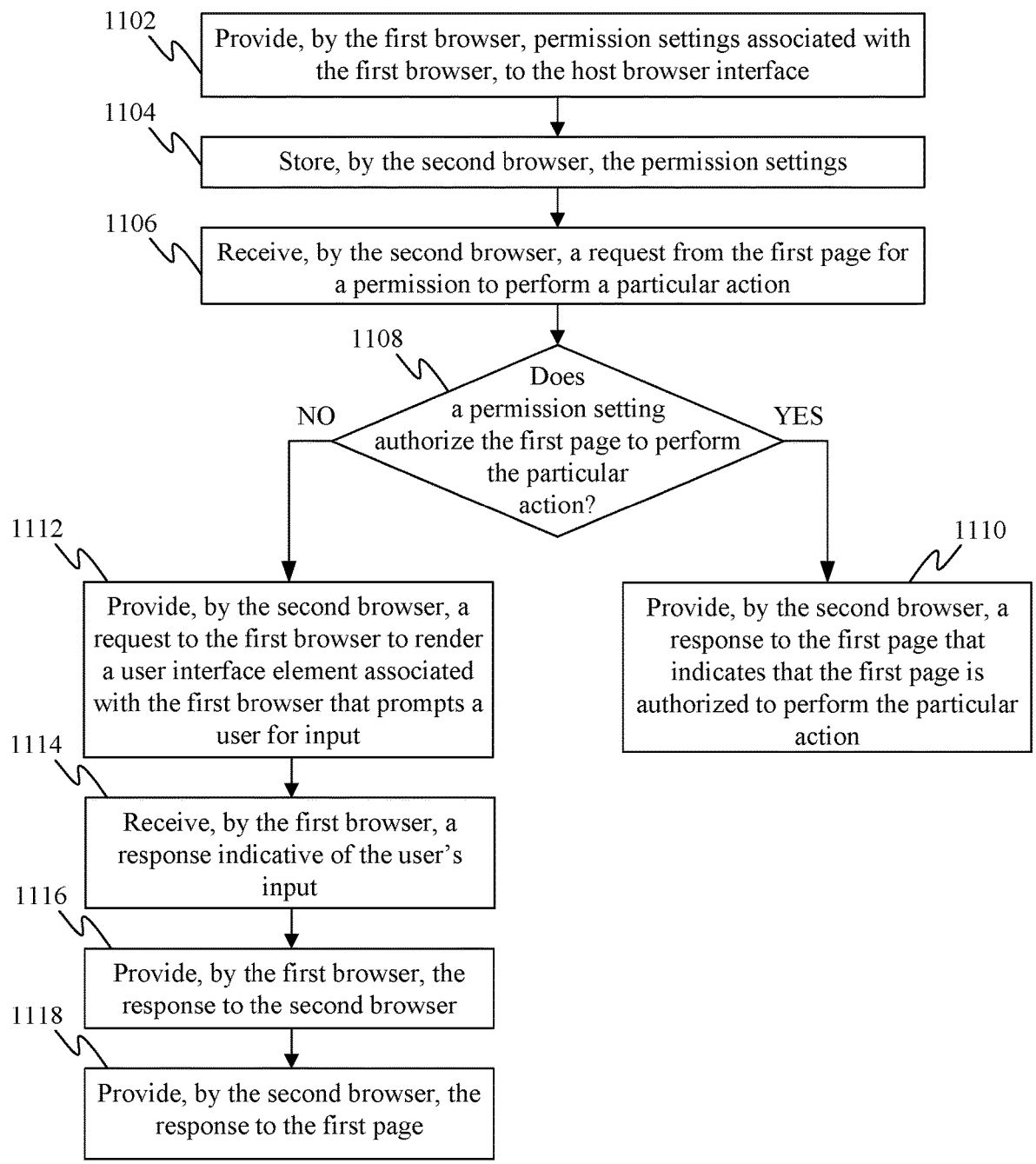
FIG. 11 shows a flowchart of a method for providing permission settings of a first browser to a second browser in accordance with an example embodiment.
Figure 12A:
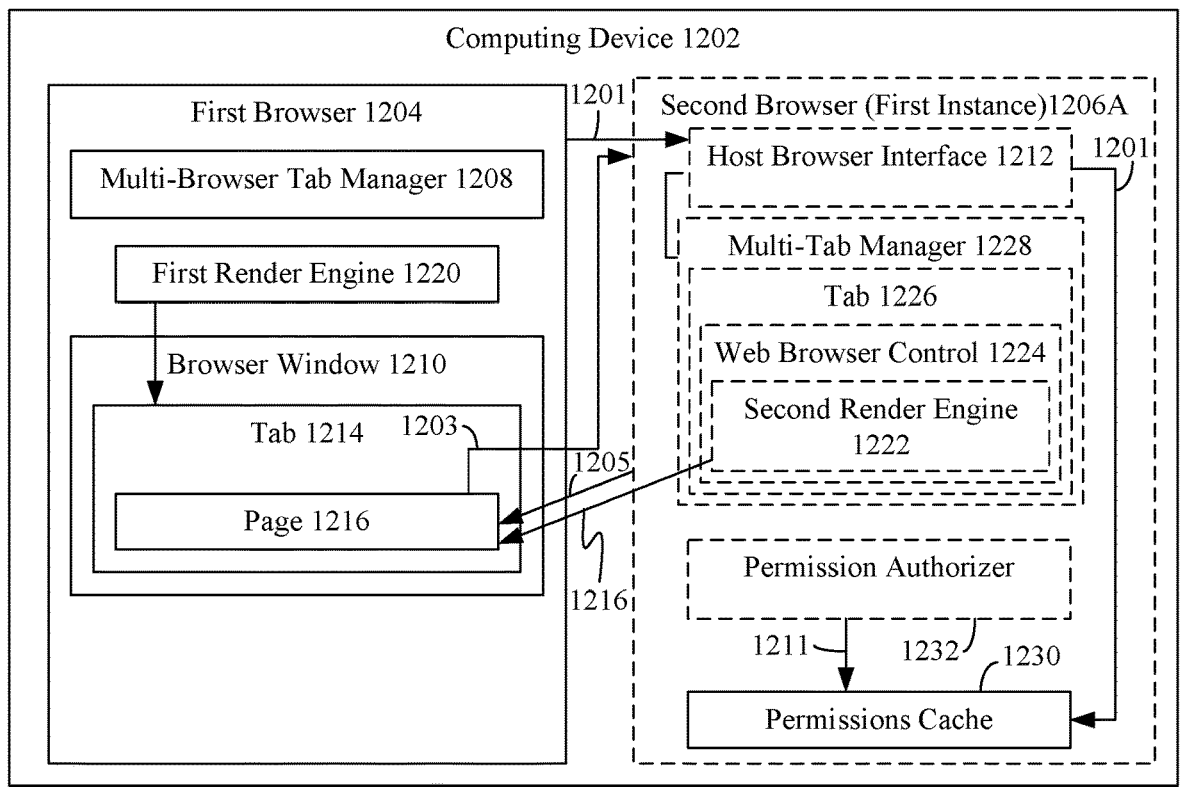
FIGS. 12A and 12B show block diagrams of systems configured to enable permission settings of a first browser to be provided to a second browser in accordance with an example embodiment.
Figure 12B:
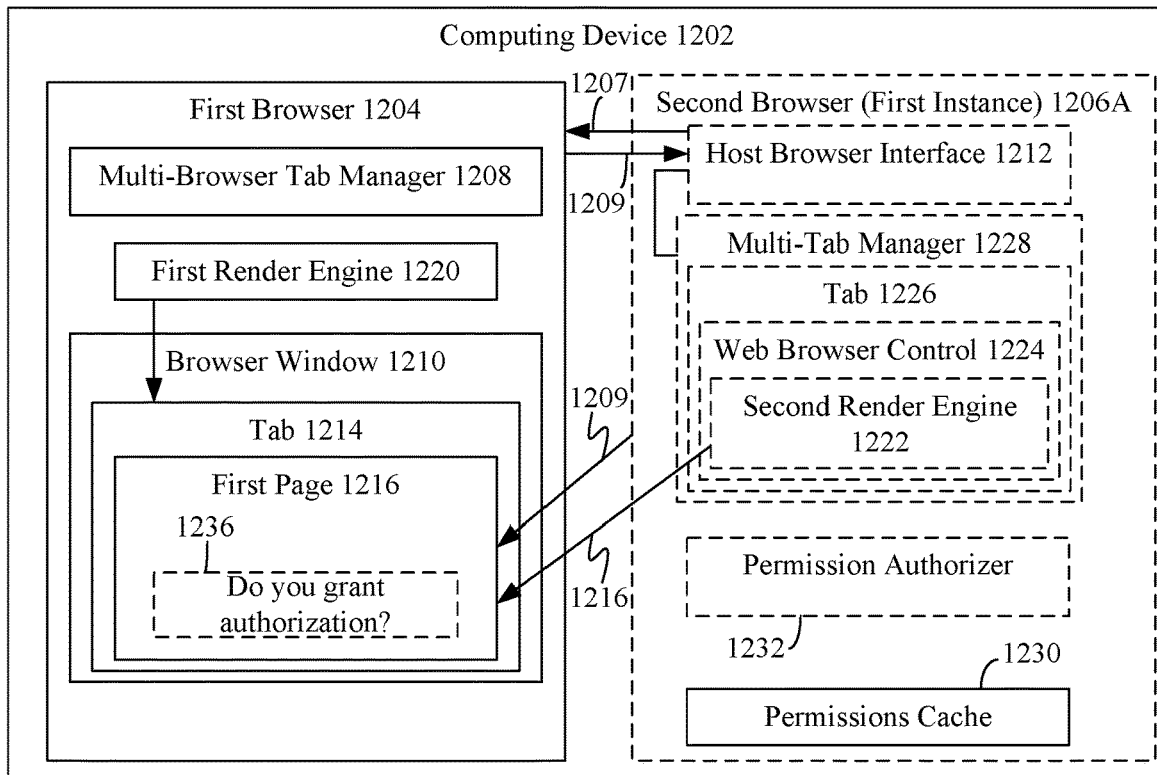

FIG. 11 shows a flowchart 1100 of a method for providing permission settings of a first browser to a second browser in accordance with an example embodiment. In an embodiment, flowchart 1100 may be implemented by systems 1200A and 1200B shown in FIGS. 12A and 12B, although the method is not limited to those implementations. As shown in FIGS. 12A and 12B, systems 1200A and 1200B include a computing device 1202 that includes first browser 1204 and an instance of second browser 1206A. First browser 1204 includes a first render engine 1220 and a multi-browser tab manager 1208, and has an open browser window 1210 that includes one or more tabs (e.g., tab 1214). Second browser 1206A includes a multi-tab manager 1228, second render engine 1222 and a host browser interface 1212. Multi-tab manager 1228 may be configured to manage one or more tabs (e.g., tab 1226). Tab 1226 may comprise a web browser control 1224 and/or other layers of functionality. Second render engine 1222 may be managed by web browser control 1224. Computing device 1202, first browser 1204, multi-browser tab manager 1208, first render engine 1220, browser window 1210, tab 1214, second browser (first instance) 1206A, host browser interface 1212, multi-tab manager 1228, tab 1226, web browser control 1224, and second render engine 1222 are examples of computing device 102, first browser 104, multi-browser tab manager 108, first render engine 120, browser window 110, tab 114, second browser (first instance) 106A, host browser interface 112, multi-tab manager 128, tab 126, web browser control 124, and second render engine 122, as respectively described above with reference to FIGS. 1A and 1B. In the embodiments shown in FIGS. 12A and 12B, second browser (first instance) 1206A has traversed to a first page (e.g., page 1216). Page 1216 is an example of page 116, as described above with reference to FIG. 1A. As further shown in FIGS. 12A and 12B, second browser (first instance) 1206A maintains a permissions cache 1230 and a permission authorizer 1232, which is executed by computing device 1202.

Flowchart 1100 begins with step 1102. In step 1102, permissions settings associated with the first browser are provided by the first browser to the host browser interface. For example, with reference to FIG. 12A, first browser 1204 provides its permission settings 1201 to host browser interface 1212 of second browser (first instance) 1206A. Permission settings 1201 may be provided to second browser (first instance) 1206A when second browser (first instance) 1206A is initialized. Permission settings 1201 may comprise a subset (e.g., some or all) of the settings maintained by first browser 1204.

In step 1104, the permission settings are stored by the second browser. For example, with reference to FIG. 12A, second browser (first instance) 1206A stores permission settings 1201 in permissions cache 1230.

In step 1106, a request from the first page for a permission to perform a particular action is received by the second browser. For example, with reference to FIG. 12A, second browser (first instance) 1206A may receive a request 1203 from page 1216 (e.g., a script executing on page 1216) for a permission to perform a particular action (e.g., obtain a geolocation of computing device 1202).

In step 1108, a determination is made as to whether a permission setting of the permission settings authorizes the first page to perform the action. For example, with reference to FIG. 12A, permission authorizer 1232 provides a query 1211 to permissions cache 1230 to determine whether a permission setting of permission settings 1201 stored in permissions cache 1230 authorizes page 1216 to perform an action. If a determination is made that the permission setting authorizes the first page to perform the action, flow continues to step 1110. Otherwise, flow continues to step 1112.

In step 1110, a response to the first page that indicates that the first page is authorized to perform the particular action is provided by the second browser. For example, with reference to FIG. 12A, second browser (first instance) 106A provides a response 1205 to page 1216 that indicates that page 1216 is authorized to perform the particular action (e.g., obtain geolocation information).

In step 1112, the second browser provides a request to the first browser to render a user interface element associated with the first browser that prompts a user for input, the input specifying whether the first page is authorized to perform the particular action. For example, with referenced to FIG. 12B, second browser (first instance) 1206A provides a request 1207 (via host browser interface 1212) to render a user interface element 1236 that prompts a user for input. First render engine 1210 renders its version of user interface element 1236, and not the version of the user interface element utilized by second browser (first instance) 1206A, thereby enabling a seamless integration of second browser (first instance) 1206A within first browser 1204.

In step 1114, a response indicative of the user's input is received by the first browser. For example, with reference to FIG. 12B, first browser 1204 may receive an input from the user specifying whether or not permission is granted or denied.

In accordance with one or more embodiments, the permissions cache is updated with the corresponding permission setting. For example, with reference to FIG. 12, permissions cache 1230 is updated with the corresponding permission setting.

In step 1116, the first browser provides the response to the second browser. For example, with reference to FIG. 12B, first browser 1204 provides a response 1209 that represents the user's input to second browser (first instance) 1206A via host browser interface 1212.

In step 1118, the second browser provides the response to the first page. For example, with referenced to FIG. 12B, second browser (first instance) 1206A provides response 1209 to page 1218.

III. Additional Embodiments

Referring again to FIG. 1A, in certain embodiments, second browser 106 may not be properly invoked (e.g., host browser interface 112 is not properly loaded). This may occur, for example, if second browser 106 is an incorrect or older version and/or the operating system in which second browser 106 is incorporated is an incorrect or older version that does not support the browser hosting functionality described herein. In this case, second browser 106 is launched in a standalone mode (i.e., first browser 104 does not invoke second browser 106 and does not host second browser 106).

IV. Example Computer System Implementation

Computing device 102, first browser 104, second browser 106, second browser (first instance) 106A, multi-browser tab manager 108, first render engine 120, tab 114, host browser interface 112, multi-tab manager 128, tab 126, web browser control 124, second render engine 122, computing device 402, first browser 404, second browser (first instance) 406A, multi-browser tab manager 408, first render engine 420, tab 414, host browser interface 412, multi-tab manager 428, tab 426, web browser control 424, second render engine 422, computing device 602, first browser 604, second browser (first instance) 606A, multi-browser tab manager 608, first render engine 620, tab 614, host browser interface 612, multi-tab manager 628, tab 626, web browser control 624, second render engine 622, computing device 802, first browser 804, second browser (first instance) 806A, multi-browser tab manager 808, first render engine 820, tab 814, host browser interface 812, multi-tab manager 828, tab 826, web browser control 824, second render engine 822, watchdog process 832, operating system 834, computing device 1002, first browser 1004, second browser (first instance) 1006A, multi-browser tab manager 1008, first render engine 1020, tab 1014, host browser interface 1012, multi-tab manager 1028, tab 1026, web browser control 1024, second render engine 1022, accelerator mapping 1030, computing device 1202, first browser 1204, second browser (first instance) 1206A, multi-browser tab manager 1208, first render engine 1220, tab 1214, host browser interface 1212, multi-tab manager 1228, tab 1226, web browser control 1224, second render engine 1222, permission analyzer 1232, and permissions cache 1230 (and/or any of the components described therein), and/or flowchart 200, 300, 500, 700, 900, and 1100, may be implemented in hardware, or hardware combined with one or both of software and/or firmware. For example, computing device 102, first browser 104, second browser 106, second browser (first instance) 106A, multi-browser tab manager 108, first render engine 120, tab 114, host browser interface 112, multi-tab manager 128, tab 126, web browser control 124, second render engine 122, computing device 402, first browser 404, second browser (first instance) 406A, multi-browser tab manager 408, first render engine 420, tab 414, host browser interface 412, multi-tab manager 428, tab 426, web browser control 424, second render engine 422, computing device 602, first browser 604, second browser (first instance) 606A, multi-browser tab manager 608, first render engine 620, tab 614, host browser interface 612, multi-tab manager 628, tab 626, web browser control 624, second render engine 622, computing device 802, first browser 804, second browser (first instance) 806A, multi-browser tab manager 808, first render engine 820, tab 814, host browser interface 812, multi-tab manager 828, tab 826, web browser control 824, second render engine 822, watchdog process 832, operating system 834, computing device 1002, first browser 1004, second browser (first instance) 1006A, multi-browser tab manager 1008, first render engine 1020, tab 1014, host browser interface 1012, multi-tab manager 1028, tab 1026, web browser control 1024, second render engine 1022, accelerator mapping 1030, computing device 1202, first browser 1204, second browser (first instance) 1206A, multi-browser tab manager 1208, first render engine 1220, tab 1214, host browser interface 1212, multi-tab manager 1228, tab 1226, web browser control 1224, second render engine 1222, permission analyzer 1232, and permissions cache 1230 (and/or any of the components described therein), and/or flowchart 200, 300, 500, 700, 900, and 1100 may be implemented as computer program code/instructions configured to be executed in one or more processors and stored in a computer readable storage medium.

Alternatively, computing device 102, first browser 104, second browser 106, second browser (first instance) 106A, multi-browser tab manager 108, first render engine 120, tab 114, host browser interface 112, multi-tab manager 128, tab 126, web browser control 124, second render engine 122, computing device 402, first browser 404, second browser (first instance) 406A, multi-browser tab manager 408, first render engine 420, tab 414, host browser interface 412, multi-tab manager 428, tab 426, web browser control 424, second render engine 422, computing device 602, first browser 604, second browser (first instance) 606A, multi-browser tab manager 608, first render engine 620, tab 614, host browser interface 612, multi-tab manager 628, tab 626, web browser control 624, second render engine 622, computing device 802, first browser 804, second browser (first instance) 806A, multi-browser tab manager 808, first render engine 820, tab 814, host browser interface 812, multi-tab manager 828, tab 826, web browser control 824, second render engine 822, watchdog process 832, operating system 834, computing device 1002, first browser 1004, second browser (first instance) 1006A, multi-browser tab manager 1008, first render engine 1020, tab 1014, host browser interface 1012, multi-tab manager 1028, tab 1026, web browser control 1024, second render engine 1022, accelerator mapping 1030, computing device 1202, first browser 1204, second browser (first instance) 1206A, multi-browser tab manager 1208, first render engine 1220, tab 1214, host browser interface 1212, multi-tab manager 1228, tab 1226, web browser control 1224, second render engine 1222, permission analyzer 1232, and permissions cache 1230 (and/or any of the components described therein), and/or flowchart 200, 300, 500, 700, 900, and 1100 may be implemented as hardware logic/electrical circuitry.

For instance, in an embodiment, one or more, in any combination, of computing device 102, first browser 104, second browser 106, second browser (first instance) 106A, multi-browser tab manager 108, first render engine 120, tab 114, host browser interface 112, multi-tab manager 128, tab 126, web browser control 124, second render engine 122, computing device 402, first browser 404, second browser (first instance) 406A, multi-browser tab manager 408, first render engine 420, tab 414, host browser interface 412, multi-tab manager 428, tab 426, web browser control 424, second render engine 422, computing device 602, first browser 604, second browser (first instance) 606A, multi-browser tab manager 608, first render engine 620, tab 614, host browser interface 612, multi-tab manager 628, tab 626, web browser control 624, second render engine 622, computing device 802, first browser 804, second browser (first instance) 806A, multi-browser tab manager 808, first render engine 820, tab 814, host browser interface 812, multi-tab manager 828, tab 826, web browser control 824, second render engine 822, watchdog process 832, operating system 834, computing device 1002, first browser 1004, second browser (first instance) 1006A, multi-browser tab manager 1008, first render engine 1020, tab 1014, host browser interface 1012, multi-tab manager 1028, tab 1026, web browser control 1024, second render engine 1022, accelerator mapping 1030, computing device 1202, first browser 1204, second browser (first instance) 1206A, multi-browser tab manager 1208, first render engine 1220, tab 1214, host browser interface 1212, multi-tab manager 1228, tab 1226, web browser control 1224, second render engine 1222, permission analyzer 1232, and permissions cache 1230 (and/or any of the components described therein), and/or flowchart 200, 300, 500, 700, 900, and 1100 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

FIG. 13 depicts an exemplary implementation of a computing device 1300 in which embodiments may be implemented. For example, computing devices 102, 402, 602, 802, 1002, and/or 1202 may be implemented in one or more computing devices similar to computing device 1300 in stationary or mobile computer embodiments, including one or more features of computing device 1300 and/or alternative features. The description of computing device 1300 provided herein is provided for purposes of illustration, and is not intended to be limiting. Embodiments may be implemented in further types of computer systems, as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random-access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1334 may include, for example, computer program logic (e.g., computer program code or instructions) for implementing any of the features of computing device 102, first browser 104, second browser 106, second browser (first instance) 106A, multi-browser tab manager 108, first render engine 120, tab 114, host browser interface 112, multi-tab manager 128, tab 126, web browser control 124, second render engine 122, computing device 402, first browser 404, second browser (first instance) 406A, multi-browser tab manager 408, first render engine 420, tab 414, host browser interface 412, multi-tab manager 428, tab 426, web browser control 424, second render engine 422, computing device 602, first browser 604, second browser (first instance) 606A, multi-browser tab manager 608, first render engine 620, tab 614, host browser interface 612, multi-tab manager 628, tab 626, web browser control 624, second render engine 622, computing device 802, first browser 804, second browser (first instance) 806A, multi-browser tab manager 808, first render engine 820, tab 814, host browser interface 812, multi-tab manager 828, tab 826, web browser control 824, second render engine 822, watchdog process 832, operating system 834, computing device 1002, first browser 1004, second browser (first instance) 1006A, multi-browser tab manager 1008, first render engine 1020, tab 1014, host browser interface 1012, multi-tab manager 1028, tab 1026, web browser control 1024, second render engine 1022, accelerator mapping 1030, computing device 1202, first browser 1204, second browser (first instance) 1206A, multi-browser tab manager 1208, first render engine 1220, tab 1214, host browser interface 1212, multi-tab manager 1228, tab 1226, web browser control 1224, second render engine 1222, permission analyzer 1232, and permissions cache 1230 (and/or any of the components described therein), and/or flowchart 200, 300, 500, 700, 900, and 1100, and/or further embodiments described herein.

A user may enter commands and information into computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to, or incorporated in computing device 1300. Display screen 1344 may display information, as well as being a user interface for receiving user commands and/or other information (e.g., by touch, finger gestures, virtual keyboard, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

As used herein, the terms "computer program medium," "computer-readable medium," and "computer-readable storage medium" are used to refer to physical hardware media such as the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1342, or any other interface type. Such computer programs, when executed or loaded by an application, enable computing device 1300 to implement features of embodiments discussed herein. Accordingly, such computer programs represent controllers of the computing device 1300.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

III. Additional Example Embodiments

A method in a computing device is described herein. The method comprises: executing a first browser in the computing device, the first browser having an open browser window; receiving a request at the first browser to navigate to a first page; determining that the first page is incompatible with the first browser and compatible with a second browser; sending, by the first browser, an invocation request to invoke an instance of the second browser; responsive to receiving the invocation request, loading, by the instance of the second browser, a host browser interface for the instance of the second browser, the host browser interface being coupled to a browser frame layer of the instance of the second browser; and executing, under control by the first browser, the instance of the second browser without a browser window opening for the instance of the second browser.

In one embodiment of the foregoing method, the method further comprises: providing an address of the first page to the instance of the second browser; and rendering, by the instance of the second browser, the first page, the first page being hosted within a tab in the browser window of the first browser.

In one embodiment of the foregoing method, the method further comprises: providing at least one of an address of a second page to which the instance of the second browser has traversed or a security indicator associated with the second page to the first browser; rendering, by the instance of the second browser, the second page, the second page being hosted within the tab in the browser window of the first browser; and displaying the at least one of the address via an address bar associated with the first browser or a graphical user interface element that is representative of the security indicator and that is associated with the first browser.

In one embodiment of the foregoing method, the method further comprises: receiving, from the host browser interface, a status indicator indicative of a status of the first page being rendered by the instance of the second browser; and displaying, by the first browser, a graphical user interface element that is representative of the status indicator and that is associated with the first browser.

In one embodiment of the foregoing method, the method further comprises: providing, by the first browser, a process identifier associated with the first browser to the host browser interface; determining that the first browser is inactive based on the process identifier; and in response to determining that the first browser is no longer active, causing the instance of the second browser to be terminated.

In one embodiment of the foregoing method, the method further comprises: receiving, from the host browser interface, first accelerator input provided to the instance of the second browser; determining whether the first accelerator input matches a second accelerator input stored in an accelerator mapping associated with the first browser; in response to determining that the first accelerator input matches the second accelerator input, performing, by the first browser, an action corresponding to the first accelerator input; and in response to determining that the first accelerator input does not match the second accelerator input, bypassing the processing of the first accelerator input.

In one embodiment of the foregoing method, the method further comprises: providing, by the first browser, permission settings associated with the first browser, to the host browser interface; storing, by the second browser, the permission settings; receiving, by the second browser, a request from the first page for a permission to perform a particular action; determining whether a permission setting of the permission settings authorizes the first page to perform the particular action; in response to determining that the permission setting authorizes the first page to perform the particular action, providing, by the second browser, a response to the first page that indicates that the first page is authorized to perform the particular action; and in response to determining that the permission setting does not authorize the first page to perform the particular action: providing, by the second browser, a request to the first browser to render a user interface element associated with the first browser that prompts a user for input, the input specifying whether the first page is authorized to perform the particular action; receiving, by the first browser, a response indicative of the user's input; providing, by the first browser, the response to the second browser; and providing, by second browser, the response to the first page.

In one embodiment of the foregoing method, functionality of the instance of the second browser is hosted within the first browser, the functionality including at least one of: virtual tab switching; browser helper objects; and one or more browser extensions.

A system is also described herein. The system includes at least one processor circuit; and at least one memory that stores program code configured to be executed by the at least one processor circuit, the program code comprising: a first browser configured to: receive a request at a first browser to navigate to a first page, the first browser having an open browser window; determine that the first page is incompatible with the first browser and compatible with a second browser; and send an invocation request; to invoke an instance of the second browser; and a second browser configured to: invoke an instance thereof responsive to receiving the invocation request, the instance of the second browser being configured to: load a host browser interface for the instance of the second browser, the host browser interface being coupled to a browser frame layer of the instance of the second browser, the first browser being further configured to control execution of the instance of the second browser without a browser window opening for the instance of the second browser.

In one embodiment of the foregoing system, the first browser is further configured to provide an address of the first page to the instance of the second browser, and wherein the instance of the second browser is configured to render the first page, the first page being hosted within a tab in the browser window of the first browser.

In one embodiment of the foregoing system, the instance of the second browser is further configured to provide at least one of an address of a second page to which the instance of the second browser has traversed or a security indicator associated with the second page to the first browser, and render the second page, the second page being hosted within the tab in the browser window of the first browser, and the first browser is configured to display the at least one of the address via an address bar associated with the first browser or a graphical user interface element that is representative of the security indicator and that is associated with the first browser.

In one embodiment of the foregoing system, the first browser is further configured to: receive, from the host browser interface, a status indicator indicative of a status of the first page being rendered by the instance of the second browser; and display a graphical user interface element that is representative of the status indicator and that is associated with the first browser.

In one embodiment of the foregoing system, the first browser is further configured to provide a process identifier associated with the first browser to the host browser interface, and the instance of the second browser is further configured to: determine that the first browser is inactive based on the process identifier; and in response to determining that the first browser is no longer active, cause the instance of the second browser to be terminated.

In one embodiment of the foregoing system, the host browser interface is a dynamic linked library.

In one embodiment of the foregoing system, the invocation request comprises one or more parameters that specify at least one of a name of the host browser interface or a location from which to load the host browser interface.

In one embodiment of the foregoing system, the invocation request comprises a parameter that instructs the instance of the second browser to: suppress an opening of the browser window of the instance of the second browser; provide at least one of rendering information or contextual information associated with the instance of the second browser to the first browser; and cause the first page to be opened in a tab of the first browser.

A computer-readable storage medium having program instructions recorded thereon that, when executed by at least one processor of a computing device, perform a method. The method includes: executing a first browser in the computing device, the first browser having an open browser window; receiving a request at the first browser to navigate to a first page; determining that the first page is incompatible with the first browser and compatible with a second browser; sending, by the first browser, an invocation request to invoke an instance of the second browser; responsive to receiving the invocation request, loading, by the instance of the second browser, a host browser interface for the instance of the second browser, the host browser interface being coupled to a browser frame layer of the instance of the second browser; and executing, under control by the first browser, the instance of the second browser without a browser window opening for the instance of the second browser.

In one embodiment of the foregoing computer-readable storage medium, the method further comprises: providing an address of the first page to the instance of the second browser; and rendering, by the instance of the second browser, the first page, the first page being hosted within a tab in the browser window of the first browser.

In one embodiment of the foregoing computer-readable storage medium, the method further comprises: providing at least one of an address of a second page to which the instance of the second browser has traversed or a security indicator associated with the second page to the first browser; rendering, by the instance of the second browser, the second page, the second page being hosted within the tab in the browser window of the first browser; and displaying the at least one of the address via an address bar associated with the first browser or a graphical user interface element that is representative of the security indicator and that is associated with the first browser.

In one embodiment of the foregoing computer-readable storage medium, the method further comprises: receiving, from the host browser interface, a status indicator indicative of a status of the first page being rendered by the instance of the second browser; and displaying, by the first browser, a graphical user interface element that is representative of the status indicator and that is associated with the first browser.

In one embodiment of the foregoing computer-readable storage medium, the method further comprises: providing, by the first browser, a process identifier associated with the first browser to the host browser interface; determining that the first browser is inactive based on the process identifier; and in response to determining that the first browser is no longer active, causing the instance of the second browser to be terminated.

In one embodiment of the foregoing computer-readable storage medium, the host browser interface is a dynamic linked library.

IV. CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a computing device, comprising:
executing a first browser in the computing device, the first browser having an open browser window;
receiving a request at the first browser to navigate to a first page;
determining, by the first browser, that the first page is incompatible with the first browser and compatible with a second browser;
responsive to the determining, sending, by the first browser, an invocation request to invoke an instance of the second browser in a separate process;
responsive to receiving the invocation request, loading, by the instance of the second browser, a host browser interface loaded into the separate process of the instance of the second browser, the host browser interface being coupled to a browser frame layer of the instance of the second browser; and
executing, under control by the first browser, the instance of the second browser without a browser window opening for the instance of the second browser.

2. The method of claim 1, further comprising:
providing an address of the first page to the instance of the second browser; and
rendering, by the instance of the second browser, the first page, the first page being hosted within a tab in the browser window of the first browser.

3. The method of claim 2, further comprising:
providing at least one of an address of a second page to which the instance of the second browser has traversed or a security indicator associated with the second page to the first browser;
rendering, by the instance of the second browser, the second page, the second page being hosted within the tab in the browser window of the first browser; and
displaying the at least one of the address via an address bar associated with the first browser or a graphical user interface element that is representative of the security indicator and that is associated with the first browser.

4. The method of claim 2, further comprising:
receiving, from the host browser interface, a status indicator indicative of a status of the first page being rendered by the instance of the second browser; and
displaying, by the first browser, a graphical user interface element that is representative of the status indicator and that is associated with the first browser.

5. The method of claim 1, further comprising:
providing, by the first browser, a process identifier associated with the first browser to the host browser interface;
determining that the first browser is inactive based on the process identifier; and
in response to determining that the first browser is no longer active, causing the instance of the second browser to be terminated.

6. The method of claim 1, further comprising:
receiving, from the host browser interface, first accelerator input provided to the instance of the second browser;
determining whether the first accelerator input matches a second accelerator input stored in an accelerator mapping associated with the first browser;
in response to determining that the first accelerator input matches the second accelerator input, performing, by the first browser, an action corresponding to the first accelerator input; and
in response to determining that the first accelerator input does not match the second accelerator input, bypassing the processing of the first accelerator input.

7. The method of claim 1, further comprising:
providing, by the first browser, permission settings associated with the first browser, to the host browser interface;
storing, by the second browser, the permission settings;
receiving, by the second browser, a request from the first page for a permission to perform a particular action;
determining whether a permission setting of the permission settings authorizes the first page to perform the particular action;
in response to determining that the permission setting authorizes the first page to perform the particular action, providing, by the second browser, a response to the first page that indicates that the first page is authorized to perform the particular action; and
in response to determining that the permission setting does not authorize the first page to perform the particular action:
providing, by the second browser, a request to the first browser to render a user interface element associated with the first browser that prompts a user for input, the input specifying whether the first page is authorized to perform the particular action;
receiving, by the first browser, a response indicative of the user's input;
providing, by the first browser, the response to the second browser; and
providing, by second browser, the response to the first page.

8. The method of claim 1, wherein functionality of the instance of the second browser is hosted within the first browser, the functionality including at least one of:
virtual tab switching;
browser helper objects; and
one or more browser extensions.

9. A system, comprising:
at least one processor circuit; and
at least one memory that stores program code configured to be executed by the at least one processor circuit, the program code comprising:
a first browser configured to:
receive a request at a first browser to navigate to a first page, the first browser having an open browser window;
determine that the first page is incompatible with the first browser and compatible with a second browser; and
responsive to a determination that the first page is incompatible with the first browser and compatible with the second browser, send an invocation request; to invoke an instance of the second browser in a separate process; and a second browser configured to:
invoke an instance thereof responsive to receiving the invocation request, the instance of the second browser being configured to:
load a host browser interface in the separate process of the instance of the second browser, the host browser interface being coupled to a browser frame layer of the instance of the second browser,
the first browser being further configured to control execution of the instance of the second browser without a browser window opening for the instance of the second browser.

10. The system of claim 9, wherein the first browser is further configured to provide an address of the first page to the instance of the second browser, and wherein the instance of the second browser is configured to render the first page, the first page being hosted within a tab in the browser window of the first browser.

11. The system of claim 10, wherein the instance of the second browser is further configured to provide at least one of an address of a second page to which the instance of the second browser has traversed or a security indicator associated with the second page to the first browser, and render the second page, the second page being hosted within the tab in the browser window of the first browser, and
wherein the first browser is configured to display the at least one of the address via an address bar associated with the first browser or a graphical user interface element that is representative of the security indicator and that is associated with the first browser.

12. The system of claim 10, wherein the first browser is further configured to:
receive, from the host browser interface, a status indicator indicative of a status of the first page being rendered by the instance of the second browser; and
display a graphical user interface element that is representative of the status indicator and that is associated with the first browser.

13. The system of claim 9, wherein the first browser is further configured to provide a process identifier associated with the first browser to the host browser interface, and
wherein the instance of the second browser is further configured to:
determine that the first browser is inactive based on the process identifier; and
in response to determining that the first browser is no longer active,
cause the instance of the second browser to be terminated.

14. The system of claim 9, wherein the host browser interface is a dynamic linked library.

15. The system of claim 9, wherein the invocation request comprises one or more parameters that specify at least one of a name of the host browser interface or a location from which to load the host browser interface.

16. The system of claim 9, wherein the invocation request comprises a parameter that instructs the instance of the second browser to:
suppress an opening of the browser window of the instance of the second browser;
provide at least one of rendering information or contextual information associated with the instance of the second browser to the first browser; and
cause the first page to be opened in a tab of the first browser.

17. A computer-readable storage medium having program instructions recorded thereon that, when executed by at least one processor of a computing device, perform a method, the method comprising:
executing a first browser in the computing device, the first browser having an open browser window;
receiving a request at the first browser to navigate to a first page;
determining, by the first browser, that the first page is incompatible with the first browser and compatible with a second browser;
responsive to the determining, sending, by the first browser, an invocation request to invoke an instance of the second browser in a separate process;
responsive to receiving the invocation request, loading, by the instance of the second browser, a host browser interface into the separate process of the instance of the second browser, the host browser interface being coupled to a browser frame layer of the instance of the second browser; and
executing, under control by the first browser, the instance of the second browser without a browser window opening for the instance of the second browser.

18. The computer-readable storage medium of claim 17, wherein the method further comprises:
providing an address of the first page to the instance of the second browser; and
rendering, by the instance of the second browser, the first page, the first page being hosted within a tab in the browser window of the first browser.

19. The computer-readable storage medium of claim 18, the method further comprising:
providing at least one of an address of a second page to which the instance of the second browser has traversed or a security indicator associated with the second page to the first browser;
rendering, by the instance of the second browser, the second page, the second page being hosted within the tab in the browser window of the first browser; and
displaying the at least one of the address via an address bar associated with the first browser or a graphical user interface element that is representative of the security indicator and that is associated with the first browser.

20. The computer-readable storage medium of claim 18, the method further comprising:
receiving, from the host browser interface, a status indicator indicative of a status of the first page being rendered by the instance of the second browser; and
displaying, by the first browser, a graphical user interface element that is representative of the status indicator and that is associated with the first browser.

* * * * *